United States Patent
Kavali

(10) Patent No.: US 11,170,376 B2
(45) Date of Patent: Nov. 9, 2021

(54) INFORMATIONAL AND ANALYTICAL SYSTEM AND METHOD FOR ENSURING THE LEVEL OF TRUST, CONTROL AND SECURE INTERACTION OF COUNTERPARTIES WHEN USING ELECTRONIC CURRENCIES AND CONTRACTS

(71) Applicant: Roland Kavali, Odintzovo (RU)

(72) Inventor: Roland Kavali, Odintzovo (RU)

(73) Assignee: Vivigle, Inc., Wyoming, DE (US)

( * ) Notice: Subject to any disclaimer, the term of this patent is extended or adjusted under 35 U.S.C. 154(b) by 313 days.

(21) Appl. No.: 16/425,194

(22) Filed: May 29, 2019

(65) Prior Publication Data

US 2020/0380520 A1  Dec. 3, 2020

(51) Int. Cl.
| | | |
|---|---|---|
| *G06Q 10/10* | (2012.01) | |
| *G06Q 10/08* | (2012.01) | |
| *G06Q 30/02* | (2012.01) | |
| *G06Q 40/08* | (2012.01) | |
| *G06Q 20/40* | (2012.01) | |
| *G06Q 50/26* | (2012.01) | |

(52) U.S. Cl.
CPC ....... *G06Q 20/4016* (2013.01); *G06Q 50/265* (2013.01)

(58) Field of Classification Search
CPC ............. G06Q 20/4016; G06Q 50/265; G06Q 2220/00; G06Q 20/065; G06Q 20/02; H04L 63/12; H04L 9/3239; H04L 2209/56; H04L 2209/38

USPC .................................................. 705/1.1–912
See application file for complete search history.

(56) References Cited

U.S. PATENT DOCUMENTS

| | | | | |
|---|---|---|---|---|
| 2014/0282852 | A1* | 9/2014 | Vestevich | G06F 21/6263 |
| | | | | 726/1 |
| 2017/0041296 | A1* | 2/2017 | Ford | G06F 16/951 |
| 2017/0046693 | A1* | 2/2017 | Haldenby | H04L 63/062 |
| 2018/0025442 | A1* | 1/2018 | Isaacson | G06F 3/048 |
| | | | | 705/26.62 |
| 2018/0130061 | A1* | 5/2018 | Caldera | G06Q 20/3678 |
| 2018/0240107 | A1* | 8/2018 | Andrade | G06Q 20/36 |
| 2018/0322597 | A1* | 11/2018 | Sher | H04L 67/22 |

FOREIGN PATENT DOCUMENTS

| | | | | | |
|---|---|---|---|---|---|
| WO | WO-2018197491 | A1 * | 11/2018 | ......... | G06Q 30/0283 |
| WO | WO-2019060567 | A1 * | 3/2019 | ........... | G06F 16/245 |

* cited by examiner

*Primary Examiner* — Jonathan P Ouellette
(74) *Attorney, Agent, or Firm* — Inventa Capital PLC

(57) ABSTRACT

A method and a system provide secure transactions via blockchain technology includes a step of linking an external blockchain address to a registered user by a verification of the external blockchain address of the user, wherein in response to the verification, saving the verified address and monitoring the address and one or more blockchain transactions in which the address participated. The method includes a step of creating or conducting the one or more blockchain transactions between the user and one or more other users followed by tracking and marking one or more stolen assets or assets involved in illegal transactions. The method includes a step of analyzing the one or more blockchain transactions to estimate a level of trust for the user.

9 Claims, 14 Drawing Sheets

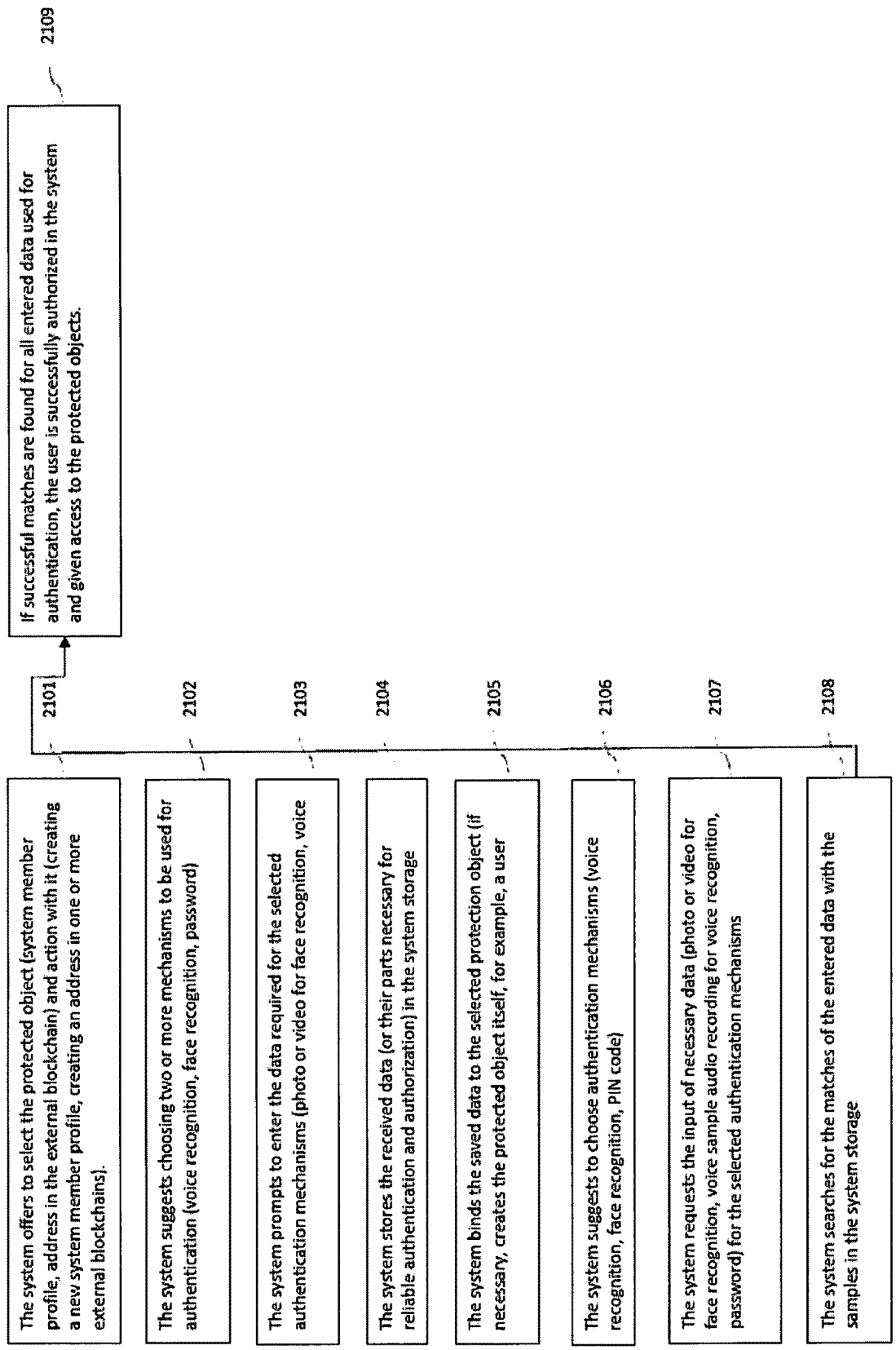
FIG 2.1

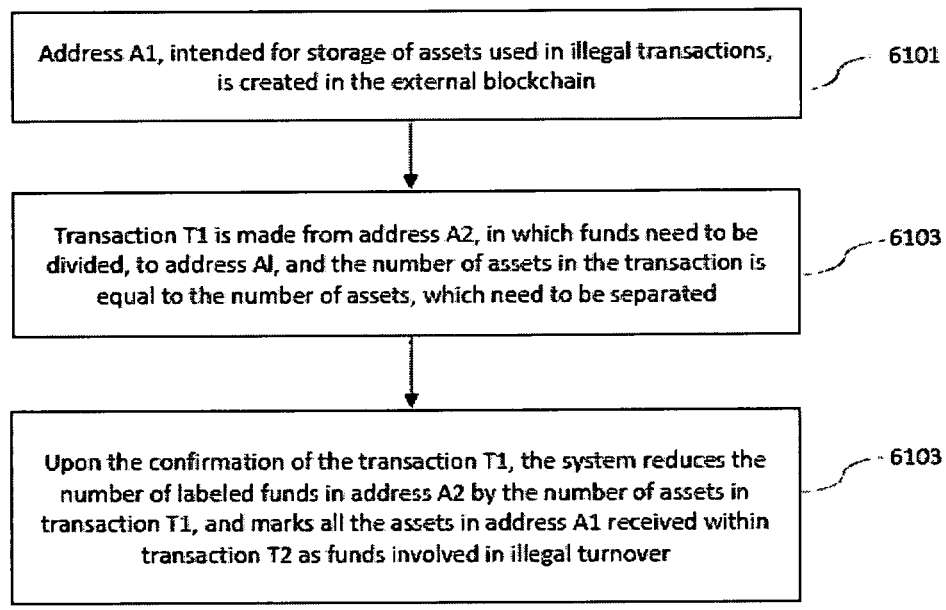
FIG 6.1

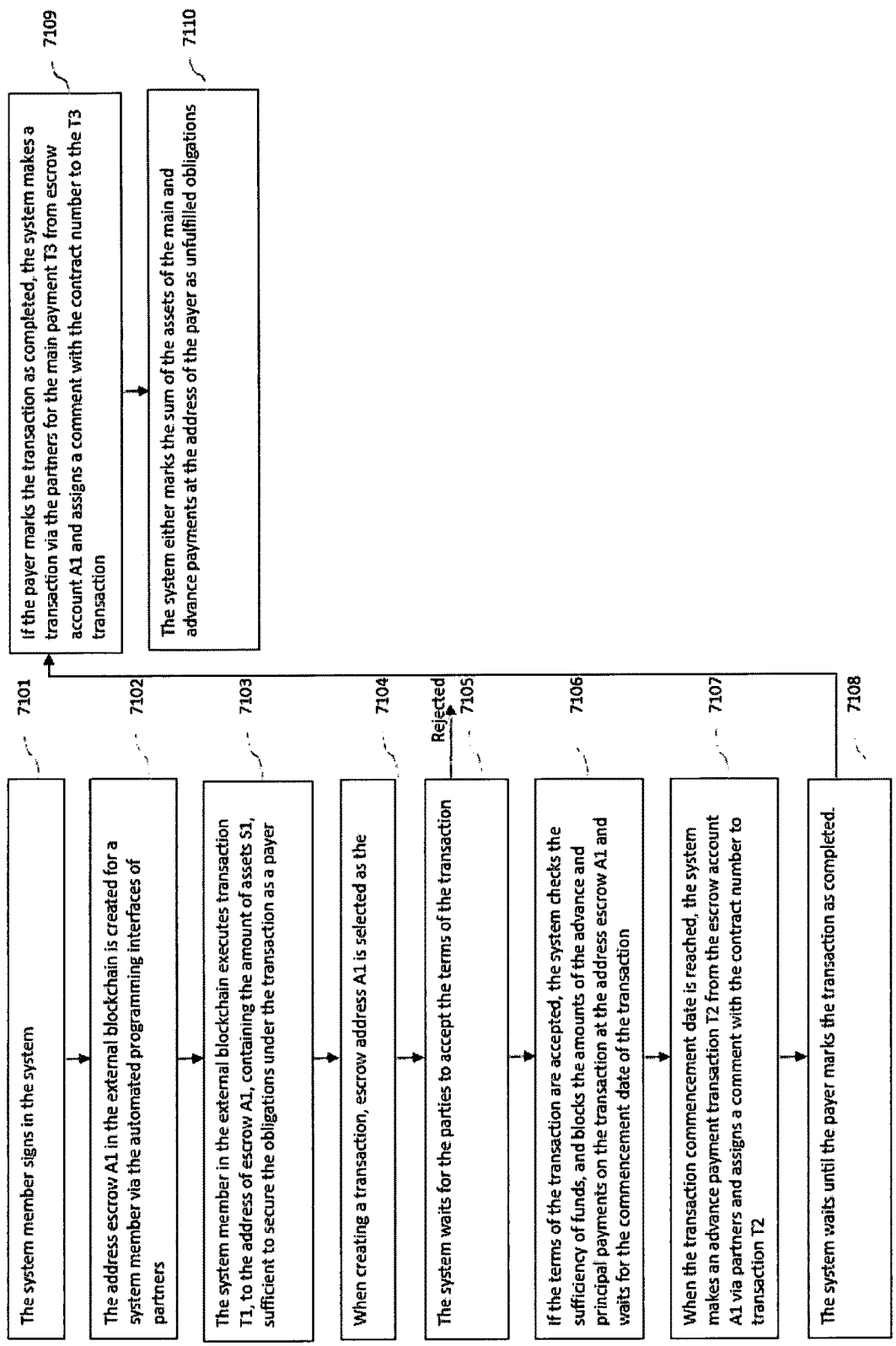
FIG 7.1

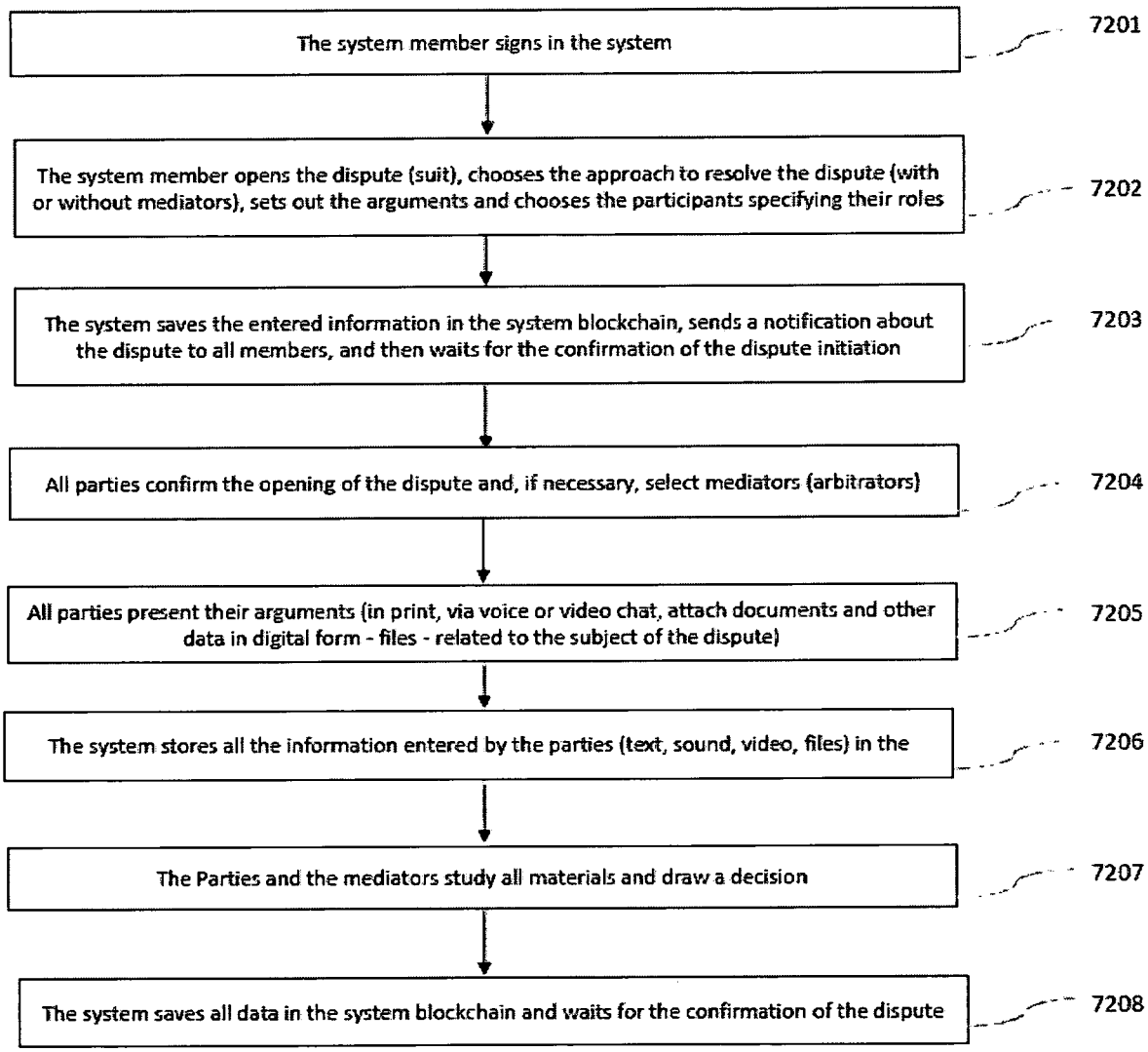
FIG 7.2

INFORMATIONAL AND ANALYTICAL SYSTEM AND METHOD FOR ENSURING THE LEVEL OF TRUST, CONTROL AND SECURE INTERACTION OF COUNTERPARTIES WHEN USING ELECTRONIC CURRENCIES AND CONTRACTS

RELATED APPLICATIONS

This non-provisional application claims priority to provisional application Ser. No. 62/918,948 filed on Feb. 20, 2019 and Ser. No. 62/919,146 filed on Feb. 27, 2019 and incorporated by reference herein in its entirety.

FIELD OF THE INVENTION

The present invention relates to a computer-implemented system and method for providing secure transactions via blockchain technology.

BACKGROUND OF THE INVENTION

Since the emergence of the idea of "private money", and later "smart contracts", which have been developed in the form of electronic currencies and contracts, interest in development in this area has been constantly growing. Every day there appear new electronic currencies and systems operating on blockchain technology. Nowadays, not only communities of enthusiasts, but also more and more public and private companies are working to create payment systems based on this technology.

The blockchain technology has a number of significant advantages over existing payment systems, in particular, some of them are as follows: providing a fairly high level of security of the electronic funds of an owner, ensuring the security of transactions and the guarantee that there is no possibility of canceling or modification of the transaction after the moment the transaction is saved in the blockchain, providing a fairly quick and cheap transaction without intermediaries, ensuring the anonymity of members in the transaction, and ensuring the possibility of making a transaction only by authorized sources.

At the same time, the existing systems and methods that implement the paradigm of electronic currencies and smart contracts, have a number of disadvantages arising from the background of the development of electronic currencies: anonymity of the transaction members prevents the control of the regulatory authorities, which, in turn, challenges the fair fulfillment of the obligations by the parties involved in the transaction. In general, issue of new electronic currency units is a decentralized process, which leads to the impossibility of regulating it. Electronic currency rates are very variable, as they depend only on supply and demand, subject to speculative operations and are not linked to real economic indicators. Due to the lack of regulators and the lack of possibility to cancel transactions, it is difficult to control the funds involved in illegal operations, which leads to a significant compromise of electronic currencies.

The art is replete with various computer-implemented systems and methods for providing secure transactions via blockchain technology. US Publication No. US20170352027 to Fan et al. teaches an apparatus including a processing platform having at least one processing device. The processing platform implements a trusted bridge configured for at least temporary coupling between one or more data sources and a smart contract program of a blockchain. The trusted bridge comprises a secure enclave component and a relay component. Data obtained from a given one of the data sources via the relay component of the trusted bridge is authenticated in the secure enclave component of the trusted bridge. Information based at least in part on the data authenticated in the secure enclave component of the trusted bridge is provided to the smart contract program of the blockchain via the relay component of the trusted bridge. The secure enclave component illustratively receives a request for authenticated data from the blockchain smart contract program via the relay component, and responds to the request via the relay component.

Another prior art reference, i.e. US Publication No. US20180341648 to Hossein et al., for example, teaches a system and method for the secure management of digital contracts utilizes technology from the following fields: digital timestamping, encryption, distributed storage, and distributed payment systems. The existing state-of-the-art contract management systems require counter-parties to give a substantial level of trust to third parties to perform functions such as storage and verification. This system and method reduce the amount of trust that the counterparties need to give to a single third party. The system and method may be used for the secure construction and management of digital contract data and metadata.

Yet another prior art reference, such as US Publication No. US20180268382 to Wasserman et al., teaches methods and systems for using blockchain digital currency are provided herein. The methods and systems comprise a blockchain digital currency that is created and utilized on a permission-based network of financial institutions. The blockchain digital currency is created by a central authority and minted into circulation by banks within the network, and is backed by reserves of real world currency of any country. The digital currency can be used for any type of financial transaction, and the system provides security, trust, traceability and a detailed audit trail for all transactions.

Alluding to the above, U.S. Pat. No. 9,928,290 to Tiell, for example, discloses techniques for determining and employing trust metrics for entities interacting with a super-platform. An end-user may interact with multiple individual platforms of different types. The individual platforms may generate data based on the interactions with end-user(s). The data from the various individual platforms may be received, ingested, stored, analyzed, aggregated, and/or otherwise processed by a super-platform. The super-platform may provide the data, aggregate data, and/or data analysis results to data consumer(s) through a marketplace associated with the super-platform. In some implementations, entities such as data providers, data manipulators, and/or data consumers may rate one another and, based on the rating(s), a trust metric may be determined that indicates a trust level of an entity.

Still another prior art reference, such as US Publication No. US20170011460 to Molinary et al., teaches a securities trading system that utilizes a distributed blockchain ledger to conduct security transactions. Users are provided with cryptographic wallets that enable the users to access a peer-to-peer network of computing nodes on which the distributed blockchain ledger is managed. The securities made available through the network may be stored directly on the blockchain ledger itself. Smart contracts may be utilized to transfer the securities among the users and to verify that all transactions are in compliance with applicable regulatory rules and other restrictions.

US Publication No. US20170221052 to Sheng teaches a computationally Efficient Transfer Processing, Auditing, and Search Apparatuses, Methods and Systems ("SOCOACT") transforms smart contract request, crypto currency deposit request, crypto collateral deposit request, crypto currency transfer request, crypto collateral transfer request inputs via SOCOACT components into transaction confirmation outputs. Also, SOCOACT transforms transaction record inputs via SOCOACT components into matrix and list tuple outputs for computationally efficient auditing. A blockchain transaction data auditing apparatus comprises a blockchain recordation component, a matrix Conversion component, and a bloom filter component. The blockchain recordation component receives a plurality of transaction records for each of a plurality of transactions, each transaction record comprising a source address, a destination address, a transaction amount and a timestamp of a transaction; the source address comprising a source wallet address corresponding to a source digital wallet, and the destination address comprising a destination wallet address corresponding to a destination virtual currency wallet; verifies that the transaction amount is available in the source virtual currency wallet; and when the transaction amount is available, cryptographically records the transaction in a blockchain comprising a plurality of hashes of transaction records. The Bloom Filter component receives the source address and the destination address, hashes the source address using a Bloom Filter to generate a source wallet address, and hashes the destination address using the Bloom Filter to generate a destination wallet address.

The Matrix Conversion component adds the source wallet address as a first row and a column entry to a stored distance matrix representing the plurality of transactions, adds the destination wallet address as a second row and column entry to the stored distance matrix representing the plurality of transactions, adds the transaction amount and the timestamp as an entry to the row corresponding to the source wallet address and the column corresponding to the destination wallet address; and generate a list representation of the matrix, where each entry in the list comprises a tuple having the source wallet address, the destination wallet address, the transaction amount and the timestamp.

Another prior art reference, such as WO2018201009 to Lafever et al, teaches systems, computer-readable media, and methods for improving both data privacy/anonymity and data value, wherein data related to a data subject can be used and stored, e.g., in a distributed ledger data structure, such as a blockchain, while minimizing re-identification risk by unauthorized parties and enabling data, including quasi-identifiers, related to the data subject to be disclosed to any authorized party by granting access only to the data relevant to that authorized party's purpose, time period, place and/or other criterion via the obfuscation of specific data values, e.g., pursuant to the European Union's General Data Protection Regulation (GDPR) or other similar regulatory schemes. The techniques described herein maintain this level of privacy/anonymity while still satisfying the immutability, auditability, and verification mandated by blockchain and other distributed ledger technologies (DLTs) for the decentralized storage of transactional data. Such systems, media, and methods may be implemented on both classical and quantum computing devices.

Finally, another foreign prior art reference WO2017161417 to Weber et al., teaches methods and apparatus for utilizing a distributed ledger, such as the Ethereum blockchain, to monitor and execute a process instance between parties that may not trust each other. The proposed methods and apparatus integrate blockchain into the choreography of processes in such a way that no central authority is needed, but trust maintained. The combination of a set of components such as a translator, a process instance and a trigger/interface, which allow for monitoring or coordination of business processes on the blockchain and off the blockchain.

The disadvantages of electronic currencies and contracts are a direct consequence of their merits and therefore cannot be eliminated without affecting the holders and users. At the same time, these shortcomings prevent the widespread recognition and distribution, as well as the embedding of electronic currencies and contracts into existing economic systems, up to the legislative prohibition of their use in several countries around the world.

In existing payment mechanisms and systems, the guarantor of the operation is, explicitly or implicitly, a third party that undertakes to control and ensure the integrity of the transaction (such parties may be banks, insurance companies, state or municipal entities).

A way out of this situation can be the development of methods and the creation of an external automated information system that consolidates the data of all electronic currencies and contracts allowing its members to take full advantage of any electronic property and at the same time guarantee the level of security, anonymity and trust determined by members at their request and with their consent.

SUMMARY OF THE INVENTION

A method for constructing an automated information and analytical system of the present invention allows ensuring trust and secure interaction of users when using various electronic currencies and contracts. The approach is equally applicable both to existing electronic currencies and to those that will be created in the future. It is based on the retrieval and subsequent analysis of data regardless of the source. The system implementing this method collects, convert and stores data from various sources, both open and proprietary ones. The main external data sources are electronic currencies and electronic contracts based on blockchain technology. Information on blocks, time, amount of transactions, addresses of participating parties, as well as blockchain-specific metadata, if any, are retrieved from external sources, independently stored and indexed. Then the system analyzes the previously extracted data in order to assign characteristics to addresses and transactions, which are used to calculate the level of trust in the address (reliability index) and, accordingly, in its real owner, regardless of whether the owner is an individual, private or public institution.

A computer-implemented system of the present invention is used for providing secure transactions via blockchain technology. The system includes a server communicatively coupled to at least one remote computing device via a network, wherein the server comprises a data conversion module for converting transaction data received from an external blockchain network and an external data cache and indexing module for receiving the converted data from the data conversion module. The system includes an external data cache storage for storing the data received from the external data cache and indexing module.

The system includes a stolen asset tracker and marker module for receiving an external data relating to a suspect asset from one or more external partners, wherein the suspect asset corresponds to stolen funds or funds involved in illegal transactions, and, based on the receiving of the external data, monitoring by the stolen asset tracker and marker module a movement of the suspect asset. The system includes a system data storage for storing at least a result of the monitoring and a trust assessment module for determining a level of trust in a blockchain address.

The system includes a non-transitory computer-readable storage medium with computer-readable instructions stored therein and a processor for executing the computer-readable instructions to: transmitting, via automated software interface, the one or more results of the monitoring to the one or more external partners for blocking or excluding the suspect asset from a circulation and validating the transaction data, the one or more external partners comprising a third-party vendor, a government agency, a trading exchange, or a cloud wallet, receiving from the one or more external partners a result of the validating of the transaction data and determining, via the trust assessment module, the level of trust in the blockchain address based on at least one of: an activity level, an asset turnover, a number of existing assets, a violation of a condition of a smart contract, or a content of the stolen funds or the funds involved in illegal transactions.

A method for providing secure transactions via blockchain technology includes a step of linking an external blockchain address to a registered user by a verification of the external blockchain address of the user, wherein in response to the verification, saving the verified address and monitoring the address and one or more blockchain transactions in which the address participated. The method includes a step of creating or conducting the one or more blockchain transactions between the user and one or more other users followed by tracking and marking one or more stolen assets or assets involved in illegal transactions. The method includes a step of analyzing the one or more blockchain transactions to estimate a level of trust for the user.

A computer readable medium storing code representing instructions that when executed at a processor cause the processor to store instructions to secure transactions via blockchain technology, the computer readable medium storing code performing linking an external blockchain address to a registered user by a verification of the external blockchain address of the user, in response to said verification, saving the verified address and monitoring the address and one or more blockchain transactions in which the address participated; creating or conducting the one or more blockchain transactions between the user and one or more other users; tracking and marking one or more stolen assets or assets involved in illegal transactions; and analyzing the one or more blockchain transactions to estimate a level of trust for the user.

The proposed method enable to eliminate partially or completely a number of shortcomings inherent in electronic currencies and contracts without interfering in the blockchain operation, consolidating data on users of electronic currencies and contracts from various external sources for the purpose of calculation and with the possibility of subsequent delivery of reliability indices and data to both individuals and state, municipal and credit organizations. Reliability indices evaluate financial solvency, professionalism, diligence, financial integrity of both registered members and the transactions themselves inside the blockchain. Data storage can be implemented on any storage media using any convenient data storage method, including blockchain technology.

Conscientious members of electronic currency systems and contracts—counterparties—are interested in clients' trust. The method provides clients with an objective assessment of counterparty reliability and data that allow customers to make a decision on concluding transactions, ensures verification and confirmation of personalized information provided by members, allows entering into contracts within the system, performing the functions of arbitration, monitors the contract implementation stages and collects feedback from the members upon completion of the transaction, tracks the funds stolen or involved in illegal transactions, taking into account the contractor reliability evaluation results. Counterparties have the ability to provide system members with any information about themselves in order to ensure their credibility.

The information and analytical system that implements this method is an ecosystem for members of electronic currency systems and contracts, where they can communicate, share information about themselves, conduct transactions and request arbitration from the service administration to resolve conflicts.

System members can be: Individuals, Legal entities, State institutions and municipal entities. The system recognizes the following situations: blockchain address is verified by a member registered in the system; blockchain address is not verified by a member registered in the system (all addresses of all electronic currencies supported by the system). Address verification by a member can be performed in one of the following ways: making a transaction from a verified address to the address specified by the system (while waiting for such a transaction, the system does not allow other system members to add a verified address), entering of the message generated by the system, signed by the secret key of the verified address, into the electronic signature system by the member, and confirmation of the member's ownership of the verified address through the API of the third-party system that is the actual owner of the address (cloud wallets, exchanges, etc.). In some cases, the address specified in the transaction may not correspond to the address from which the payment was made.

The only way to determine the real sender's address and automatically associate the payment address with the sender's address is to request the API of the third-party system, which is the actual owner of the address from which the transfer was made (cloud wallets, exchanges, etc.).

To get the maximum reliability index, the system member shall: be registered in the system, confirm his email address (by answering the service message) and phone number (by answering SMS, USSD-request or a call from the system), verify the blockchain addresses belonging to the member, complete all the identity verification procedures, not have stolen funds or funds involved in the commission of illegal operations at their addresses, all completed contracts of the member with other members shall have the maximum score from the counterparties.

To control the level of trust and, thus, exclude from circulation the stolen funds and funds involved in the illegal operations, the system analyzes, keeps a record of funds and assigns a marker to all transactions involving these funds, starting with the transaction, declared as a transaction performed in violation of the law (the system takes into account only the funds involved in theft or illegal operations, which are legally confirmed, data come from external sources).

Reliability indices include the following groups: address reliability (based on information extracted by the system from the blockchain to which the address belongs, as well as address-related information from third-party sources; calculated for both verified and unverified addresses). Member's reliability with reference to his geographical location (includes the reliability index of the addresses verified by the member). Reliability indices are calculated from the following data: the number of transactions involving a particular address, the amount of funds involved in the transactions of a particular address, the number of stolen funds or funds involved in illegal operations, the amount of personal information provided by the member and verified by the system; all counterparty's scores for fulfilled obligations.

Obligations arise between two or more members in the system when they co-create a transaction. The transaction contains the following attributes: contract (the text of the contract and/or the files associated by members with the transaction that contain information in electronic form, the set of which is determined by the members), contract start and end dates, addresses and details of payers, the amount of full and/or advance payments.

Optionally, at the request of the parties, the transaction can be signed with the keys of the members' electronic digital signature. After confirming acceptance of the transaction terms by all the parties to the contract, the transaction is considered to be concluded, and the system tracks the following events: assignment of a marker containing the amount of outstanding obligations to the address from which the funds are expected to be written off under the contract informing the system members of the temporary funds blocking (if the payer's address is already known to the system; the marker is removed if the system finds a transaction satisfying the deal conditions or transaction was closed), tracking of a transaction of withdrawal \payment receipt according to the coincidence of the address and the amount found in the transaction with those specified in the payment details, or a transaction from another address corresponding to that specified in the contract details according to the third-party system API will be found (cloud wallets, exchanges, etc.). Actions to close the transaction from all the parties involved.

When closing the transaction, the system checks the correctness of the mutual settlements (payment is made in full if the transaction is completed; the advance payment is returned if the transaction is canceled; if unambiguous interpretation is impossible, it requires clarifying information with confirmation from all the parties involved), after which it offers each member to assess the quality of performance of obligations by counterparties (member has the right not to evaluate the counterparty). This assessment is necessary to calculate the reliability of the members.

The system automatically tracks the receipt and write-off of payments from\to verified addresses. If the system succeeds in unambiguously associating a payment with an uncompleted transaction, then the corresponding transaction is assigned with a comment containing a reference to the transaction, and the transaction itself is added with information on the transaction identifier that uniquely identifies the payment under the contract. Otherwise, the transaction comment field remains empty.

Comments to blockchain transactions can be added or edited by a member at any time and are necessary to control their transactions (funds movement at verified addresses) and/or marker assignment to the addresses that are not registered in the system to control expenditures and revenues or analyze the operations of potential partners.

The system provides members with a mechanism for exchanging text messages and files through the built-in short message exchange mechanism, which allows potential counterparties to establish contacts and discuss cooperation terms, while leaving the possibility of arbitration involving the system in the event of disputes. Ensuring the security and privacy of members: the system gives the members a full right to publish or hide their profile data for general access at their own discretion (allows the member to have the maximum reliability index, but remain anonymous for other members), to ensure full protection of their data, account and confirmation of actions, the system provides the members with the possibility of multi-factor authorization using, along with the password, one or more additional mechanisms from the following list: email, telephone (SMS, USSD message and/or call), instant messaging systems, biometric data, electronic keys to provide the possibility of arbitration and issuing certificates signed with the system's electronic digital signature, the system saves the entire history of the member's actions, including information on transactions, exchanging messages and data with other members.

To provide members with the possibility of being protected against loss of funds when concluding the transactions, the system provides software interfaces to external systems to allow for deposit of funds. To implement the possibility of partial or complete blocking of stolen funds or funds involved in illegal operations, the system provides software interfaces to external systems. To confirm the personal information to another member of the system, the system offers the function of creating link to a unique page containing data selected by the member at his discretion. Only two subjects are allowed to view this link: the member who created the page and the member for whom the page was created (the function allows two members to bypass the information access restrictions and fully verify each other with a specified level of detail).

Auditing and informing a member about events via common communication channels (e-mail, telephone—SMS, USSD message and/or call; instant messaging systems) to enhance the level of security and ease of use includes the following mechanisms (customized by the member): receiving system notifications in cases of crediting or debiting funds from one or more verified addresses, receiving system notifications in cases of crediting or debiting funds from one or more selected addresses not verified by the member (any addresses known to the system), receiving system notifications about viewing a public profile of a member or one or more addresses verified by the member, receiving system notifications on the status of transactions relating to the member, and receiving system notifications about the receipt by the member of the message in the internal instant messaging system.

Being an independent and disinterested party providing services to ensure the secure interaction of members, the system has the opportunity to provide members with arbitration functions with the involvement of a third party, both within the system, if all interested parties agree with the choice of an independent arbitrator who is a party to the system, and with the involvement of state authorities (courts).

The system provides members and third parties with current and historical data signed by the system's electronic signature key (certificates) with the consent of the members: the amount of funds on the member's balance, including marking the amount of funds involved in illegal turnover, information on address trust indices, information on fund balances and address balances Information on deposit of funds, information on the member's revenues under obligations, the fulfillment of which was controlled by the system, information on investment (purchase) of funds in electronic assets sold in the blockchain supported by the system, and information about the blocking of funds by external systems at the addresses.

The summary presented above provides a basic understanding of the principle and functions of the method and the system that implements it. This description shall not be regarded as complete and is intended solely to indicate the key and critical aspects of the method in a simplified form by way of introduction to the further detailed description.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2.1 illustrates an example of authentication and authorization in the system using biometric data.

FIG. 6.1 illustrates the method of separating stolen or illicit assets from other assets.

FIG. 7.1 illustrates the method of using escrow addresses when conducting transactions.

FIG. 7.2 illustrates the method of resolving disputes between the parties with possible involvement of mediators.

DETAILED DESCRIPTION OF THE INVENTION

Figure 1:
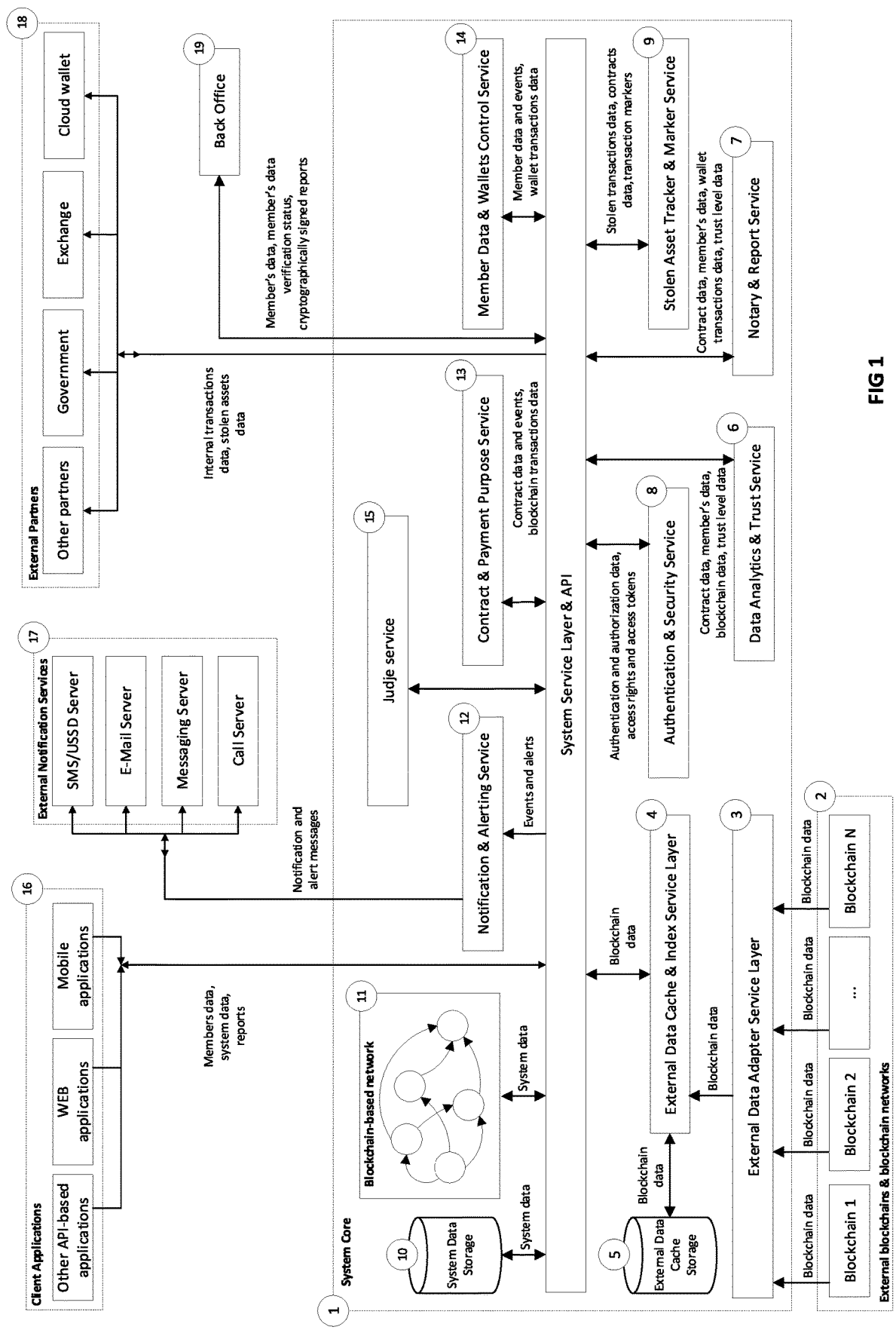
FIG. 1 illustrates an example of a system architecture that provides for determination of the level of trust, control, and secure interaction of counterparties when using electronic currencies and contracts in which the proposed method is implemented.

Referring to the Figures, a system, a method, and a non-transitory processor-readable medium, i.e. a computer readable medium, for providing secure transactions via blockchain technology is disclosed. Because explicit identification of object-oriented constructs expressed through the syntax of high-level object-oriented programming languages is lost during compilation to binary code (e.g., translation of a source code definition or representation of an application to a binary code definition or representation of the application such as a machine code or byte-code definition), potential security vulnerabilities can be obscured during static analysis of the resulting binary code. For example, because information about an object (e.g., the class on which the object is based, the size of the object, the number and types or sizes of properties of the object, and the number of functionalities accessible to the object via a dispatch table) is typically not expressed in binary code, determining whether indirect operations relative to the object expose security vulnerabilities can be difficult without the source code from which the binary code was generated.

As a specific example, an indirect operation can result in arbitrary code execution security vulnerabilities if the binary code does not include run-time validation to ensure that the indirect operation does not operate outside or beyond the object (i.e., at memory addresses not allocated to or shared by the object). Some binary code representations of applications, however, do include information about objects. Such information can be included in binary code as run-time type information (RTTI) or debugging information that is compiled into the binary code.

Nevertheless, because the binary code representations of many applications do not include such information (e.g., to discourage reverse engineering of these applications), robust methodologies and systems for analyzing binary code based on (or derived from) source code using object-oriented techniques should not assume availability of such information. Implementations discussed herein analyze operations described in binary code to identify objects based on those operations. Said differently, implementations discussed herein reconstruct, at least partially, objects (or representations of objects) by inferring the structure of such objects based on operations described in binary code.

Thus, implementations discussed herein can identify objects and attributes such as a size thereof without referring to (or independent of) source code or explicit information about such objects which may or may not be included in the binary code. Furthermore, implementations discussed herein perform security vulnerability analyses of binary code representations of applications using such objects. For example, implementations discussed herein can identify security vulnerabilities such as type confusion vulnerabilities that can result in arbitrary code execution, code injection, application failure, or other undesirable or unintended behavior of an application using information about objects identified by analysis of operations described in binary code.

As used herein, the term "software module" refers to a group of code representing instructions that can be executed at a computing system or processor to perform some functionality. Applications, software libraries (e.g., statically-linked libraries or dynamically-linked libraries), and application frameworks are examples of software modules. Additionally, as used herein, the terms "operations described in binary code" and "operations defined in binary code" and similar terms or phrases refer to operations described by code representing instructions that exist in a binary code representation (or binary representation) of a software module. In some implementations discussed herein, operations described in binary code are analyzed (e.g., parsed and interpreted) in a representation other than a binary code representation of a software module. For example, an object analysis system can analyze operations described in binary code using an intermediate representation of a software module derived from a binary code representation of that software module.

Accordingly, implementations discussed herein with reference to analysis of operations described in binary code should be understood to refer to analysis of those operations using a binary code representation of a software module or a representation of the software module derived from the binary code representation. A variable within a memory is a memory location at which one or more values can be stored. Such a memory location can be at a processor memory (e.g., a register or cache), at a system memory (e.g., a Random Access Memory (RAM) of a computing system), or at some other memory. Operations within binary code that operate on such variables can refer to a memory address (either absolute or relative to another memory address such as an offset from a stack pointer) of that memory location. Thus, the identifier (e.g., memory address) of an object can be stored as a value at a memory location with a memory address that is used by operations within the binary code.

Accordingly, as used herein, terms such as "identifier of an object" and "memory address of an object" should be understood to refer to the identifier (e.g., memory address) itself or to a variable at which a value representing the identifier is stored.

Additionally, as used herein, the singular forms "a," "an," and "the" include plural referents unless the context clearly dictates otherwise. Thus, for example, the term "module" is intended to mean one or more modules or a combination of modules. Furthermore, as used herein, the term "based on" includes based at least in part on. Thus, a feature that is described as based on some cause, can be based only on that cause, or based on that cause and on one or more other causes. It will be apparent that multiple embodiments of this disclosure may be practiced without some or all of these specific details. In other instances, well-known process operations have not been described in detail in order not to unnecessarily obscure the present embodiments.

The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." Below there are the definitions of the basic terms used in the description of the method.

A computer-implemented system of the present invention is used for providing secure transactions via blockchain technology. The system includes a server communicatively coupled to at least one remote computing device via a network, wherein the server comprises a data conversion module for converting transaction data received from an external blockchain network and an external data cache and indexing module for receiving the converted data from the data conversion module. The system includes an external data cache storage for storing the data received from the external data cache and indexing module. The system includes a stolen asset tracker and marker module for receiving an external data relating to a suspect asset from one or more external partners, wherein the suspect asset corresponds to stolen funds or funds involved in illegal transactions, and, based on the receiving of the external data, monitoring by the stolen asset tracker and marker module a movement of the suspect asset.

The system includes a system data storage for storing at least a result of the monitoring and a trust assessment module for determining a level of trust in a blockchain address. The system includes a non-transitory computer-readable storage medium with computer-readable instructions stored therein and a processor for executing the computer-readable instructions to: transmitting, via automated software interface, the one or more results of the monitoring to the one or more external partners for blocking or excluding the suspect asset from a circulation and validating the transaction data, the one or more external partners comprising a third-party vendor, a government agency, a trading exchange, or a cloud wallet, receiving from the one or more external partners a result of the validating of the transaction data and determining, via the trust assessment module, the level of trust in the blockchain address based on at least one of: an activity level, an asset turnover, a number of existing assets, a violation of a condition of a smart contract, or a content of the stolen funds or the funds involved in illegal transactions.

A method for providing secure transactions via blockchain technology includes a step of linking an external blockchain address to a registered user by a verification of the external blockchain address of the user, wherein in response to the verification, saving the verified address and monitoring the address and one or more blockchain transactions in which the address participated. The method includes a step of creating or conducting the one or more blockchain transactions between the user and one or more other users followed by tracking and marking one or more stolen assets or assets involved in illegal transactions. The method includes a step of analyzing the one or more blockchain transactions to estimate a level of trust for the user.

A computer readable medium storing code representing instructions that when executed at a processor cause the processor to store instructions to secure transactions via blockchain technology, the computer readable medium storing code performing linking an external blockchain address to a registered user by a verification of the external blockchain address of the user, in response to said verification, saving the verified address and monitoring the address and one or more blockchain transactions in which the address participated; creating or conducting the one or more blockchain transactions between the user and one or more other users; tracking and marking one or more stolen assets or assets involved in illegal transactions; and analyzing the one or more blockchain transactions to estimate a level of trust for the user.

System member is a subject (individual, legal entity, municipal entity, state institution) that has a unique identifier within the system and has passed the registration and verification of personal data. User is the same as the system member. Operator is a subject that interacts with system members through verbal and non-verbal communication (telephone, emails, instant messengers, personal communication) in order to verify and clarify data provided by system members. Blockchain is a continuously growing list of cryptographically related records, called blocks, stored on virtual repository (device for storing digital data). Electronic currency is a conditional expression of value, with or without a quantitative equivalent in real values (money, precious metals, goods and other assets) and accepted as a means of settlement in electronic payment systems. Funds are the same as electronic currency. Smart contract is a computer algorithm designed to enter into and maintain commercial contracts in blockchain technology.

Cryptocurrency is electronic currency, the issue and circulation of which are carried out with the help of technologies that use cryptographic methods (for example, blockchain technology). Address is a unique identifier in the blockchain used to record the values belonging to the subject. Wallet address is the same as the address. Wallet is one or more addresses belonging to the same subject. Reliability index is a set of characteristics assigned to a system member and taking into account his actions in the system, scores from contractors, completeness of identity verification procedures, information about transactions in order to determine a quantitative indicator (can be expressed numerically, graphically or by letter indices) of his solvency, activity, reliability as a partner in conducting transactions, the integrity of tangible and intangible assets. Level of trust is the same as the reliability index. Rating is the same as the reliability index. Transaction is the fact of transfer of a certain amount of tangible or intangible assets, such as e-currency, goods, ownership of some property or intellectual property, recorded in the system database. Those skilled in the art will appreciate that the above description is illustrative and does not limit the implementation of the method.

FIG. 1 illustrates an example of a computer system that provides for determining the level of trust, control, and secure interaction of counterparties when using electronic currencies and contracts. In general, the system consists of the core 1, including the data conversion module 3, which converts information about transactions received from different non-interconnected blockchain 2 into a general form suitable for processing by the system components and transfers the converted data to the external data caching and indexing module 4, the task of which is, firstly, to save the prepared data in repository 5 (to save computational resources and speed up the search), secondly, to search and display information about blockchain transactions for other system modules. Repository 5 can be implemented both using third-party database management systems, and by storing data in files on any existing file system.

External data to account for the amount of stolen funds or funds involved in illegal operations required by the module for accounting of stolen assets and marking 9 can be received from external partners 18 through software interfaces provided by the system or entered into the system by operators using the back office graphical interface 19 on the basis of incoming legal documents (for example, court judgment). Based on information about an illegal transaction, the module for accounting of stolen assets and marking 9 monitors the further movement of assets by counting the number of assets from an illegal transaction in each of the following transactions. The calculation results are stored in the system storage 10, as they accumulate. Accumulated data on transactions containing stolen funds can be transmitted via automated software interfaces to partners 18 who have the ability to block funds at addresses (for example, exchanges, electronic wallets) to exclude stolen funds from circulation and their further legalization. After legalization, the partners inform the system about the transactions starting from which the funds are considered to have been obtained legally and do not contain stolen funds and funds involved in illegal turnover (for example, stolen funds can be transferred first to special addresses officially designated as legalization addresses, and then to the addresses of their legal owners).

Available information on addresses and smart contracts (number of assets, transactions, number of stolen assets on the balance sheet and in each transaction, address trust level) can be viewed using client applications 16 by any persons, regardless of whether they are system members or not. Information on transactions and smart contracts in the caching and indexing external data module 4, as well as information on the presence of stolen assets or assets involved in illegal operations provided by the module for accounting of stolen assets and marking 9, is sufficient for the data analysis and trust assessment module 6, providing the calculation of levels of trust for addresses, wallets and members of the system to determine the basic level of trust in the address, both in total and for a certain period of time on such parameters (whose data are present in one volume or another in all blockchain) as activity (number of transactions), asset turnover (number of incoming and outgoing tangible and intangible assets), number of existing assets, present or absent violations of the conditions of smart contracts, content of stolen assets or assets involved in illegal operations.

Most of the existing blockchain do not contain any personal information about the owners of addresses, respectively, there is no possibility of guaranteed unambiguous binding of addresses with the entities that are their owners, and there is no possibility of assessing the level of trust in the system members. To solve this problem, the system may contain one or several client applications 16 through which the system interacts and exchanges information with members and among members within the system. In order to become the system member, a subject must pass the registration and verification procedure, which is provided by the authentication and security module 8, which is responsible for managing access rights, access security, and ensuring secure access to data. Upon completion of the registration procedure, the system is able to authenticate the subject (to verify the data entered by the subject with the data stored in the system database) and identify him as the system member, which allows associating with the system member, collecting, storing, processing, and managing the scope and ensuring security of access to personal data.

The authentication and security module 8 after registration completion allows the system members to log in to the system (to verify their identity) using single-factor or multi-factor authorization (by login and password, additional input of codes sent to members via external notification services 17, input of biometric data, for example, the use of technologies for recognition of faces, voices, fingerprints), as well as allows the system member to permit or prohibit the display of his personal information to the subjects being both the system members and non-members. In addition, a public user profile is created containing information about the system member, his wallets and transactions, which can be viewed by both system members and unregistered persons through public client applications 16. The system members can control the display of the public profile by permitting or prohibiting the system to display any information related to them.

If a situation arises when two or more system members want to provide each other with more information about themselves (or a system member wants to provide information to a non-member), the authentication and security module 8 allows the system member to create a temporary page containing any personal data (data are selected by the subject creating the page), which can only be viewed by the system member for whom this page is created.

For authorized system members, the member wallet and data management service 14 through client applications 16 receives from subjects, processes and stores the personal data (for an individual, this can be passport data, information about residence, rights, biometric data, for legal entities—statutory and other entitling documents, information about owners and management) in the system storage 10, as well as information from blockchain related to the system member (in particular, allows binding addresses to the wallet of the system member which belong to him). In some cases (passport data, statutory documents, etc.), the authenticity of the data entered by the system member requires additional verification and confirmation. Such verification is carried out either by operators through the back office 19 or through automated interfaces provided by external partners 18. The amount and accuracy of the personal information provided by the system member are taken into account by the data analysis and trust assessment module 6 when calculating the level of trust, thereby increasing the total level of trust of the system member.

Information and notification module 12 monitors transactions in blockchain and sends via external notification services 17 the notifications about events to which the system member is subscribed (for example, notification of receipt or write-off of electronic currency to selected addresses or to one of the addresses of his or other member's wallet). In addition, other system services send system members the notifications about events occurring therein. System members have the ability to permit or prohibit sending notifications to themselves through client applications 16.

The contract and payment purpose module 13 allows two or more system members to enter into and conduct transactions among themselves. The transaction contains the following mandatory attributes: contract (the text of the contract and/or the files associated by members with the transaction containing information in electronic form, the set of which is determined by the members). Contract start and end dates, addresses and details of payers, the amount of full and/or advance payments or other assets that will be transferred as a result of performance, optionally, at the request of the parties, the transaction can be signed with the keys of the electronic digital signature of the members.

All information about transactions is stored in the system blockchain 11 and counterparties are notified via the information and notification service 12 about changes in the transaction status. After confirmation of the contract terms acceptance by all the parties to the contract, the transaction is considered to be closed. The transaction can be renewed or canceled at any time (the number of amendments to the transaction is not limited, and the transaction cannot be closed until all the parties agree to the changes).

After all the parties have confirmed that the transaction has been concluded, the module for accounting of stolen assets and marking 9 marks the funds indicated in the transaction as outstanding obligations at the specified sender addresses. This allows other members of the system to view the account status of the counterparty during conclusion of the transaction.

The system tracks transactions from the payer's address to the recipient's address. If such a transaction is detected and the transfer amount coincides, the previously set marker is removed from the payer's address, and the corresponding transaction is assigned by the system with a payment purpose comment and stored in the system storage 10, containing a link to the contract with which the payment is associated. The transaction information is transmitted to the information and notification service 12, which sends a notification to the system member. In case the system fails to detect the payment automatically, the members have the opportunity to confirm receipt of the payment manually through the user interface of one of the client applications 16.

The system waits for the actions of the members confirming that the terms of the contract have been fulfilled (herewith the terms may be revised with the obligatory receipt of consent confirmation from all the parties). Any changes in the transaction are saved in the system blockchain 11, which guarantees, using cryptography, the full preservation of the history of changes and the inability of changing the data after they have been recorded in the blockchain.

After all the parties to the transaction have confirmed that the transaction is closed, the contract and payment purpose module 13 closes the transaction, verifying the correctness of the settlements (payment is made in full if the transaction is completed; the advance payment is returned if the transaction is canceled; if unambiguous interpretation is impossible, it requires clarifying information with confirmation from all the parties involved), after which it offers each member to assess the quality of performance of obligations by counterparties (member has the right not to evaluate the counterparty). This assessment is taken into account by the data analysis and trust assessment module 6 when calculating the level of trust of the system member.

In addition to transactions, the contract and payment purpose module 13 allows the system members to add comments to any transactions and addresses. Comments to blockchain transactions can be added or edited by a member at any time and required to control their transactions (funds movement at verified addresses) and/or marker assignment to the addresses that are not registered in the system to control expenditures and revenues or analyze the operations of potential partners.

The court module 15 allows the system members to receive assistance in resolving disputes and hold an arbitration with the involvement of third parties (experts) in cases where the deadline for fulfilling obligations under a transaction has expired, and the parties have claims against each other and cannot independently agree on the terms of closing the transaction satisfying all the parties. Upon receipt of the arbitration application, experts are selected. Experts can be both back-office operators 19, possessing the necessary knowledge in the field in which the arguments of the parties applied for arbitration are to be considered, and other system members with expert status. Each of the parties sets forth its arguments (in writing, via voice or video chat, in which sound and video are recorded) via its client applications 16, attaches the documents and other data in digital form (files) as evidence necessary for the experts to consider the dispute. Experts examine the data (if necessary, requesting additional information from the disputants), arbitrate the dispute and pronounce a judgment. All the data collected during arbitration, including recordings of sound and video from the chat, in which the parties communicated with the experts, are saved by the court module 15 in the system blockchain 11, which is necessary for their retrieval and re-consideration (for example, in case of filing an appeal or as court materials).

The notarization and report module 7 forms the documents containing current and historical data and signed by the system's electronic signature key (reports and certificates) and submit them to the members and third parties with the consent of the members, in particular: the amount of funds on the member's balance, including marking the amount of funds involved in illegal turnover, information on address trust indices, information on fund balances and address balances, information on deposit of funds, information on the member's revenues under obligations, the fulfillment of which was controlled by the system, information on investment (purchase) of funds in electronic assets sold in the blockchain supported by the system, and information about the blocking of funds by external systems at the addresses.

At the option of the subject who orders the document, the notarization and report module 7 can deliver the generated document via the client application modules 16, the information and notification module 12 or via back office 19 (in case when a notarized hard copy is required). The data analysis and trust assessment module 6 calculates the total level of trust for the addresses and members of the system, which includes the address trust level and the member trust level.

The address trust level is calculated for both registered and non-registered members of the system based on the number of transactions, the turnover of funds at the addresses and the funds involved in illegal operations. The member trust level can only be calculated for the users registered in the system and is calculated, in addition to the address trust level, based on the information on the amount of personal data provided and verified personal data, as well as the member rating awarded by the counterparties after joint transactions.

Figure 2:
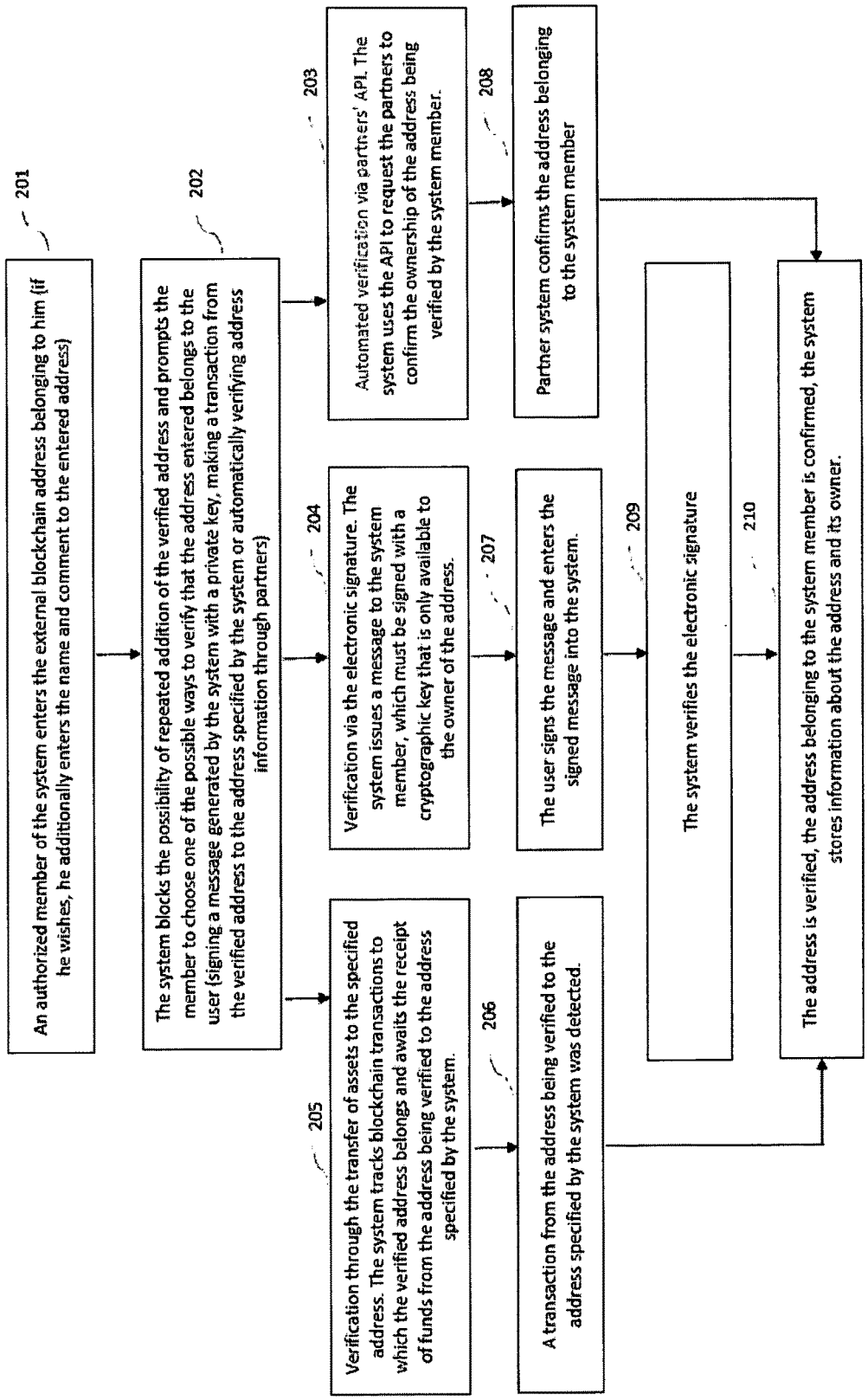
FIG. 2 illustrates linking an external blockchain address with a system member.

FIG. 2 illustrates the binding of an external blockchain address with a system member in the system shown in FIG. 1. Verification of external blockchain addresses is based on their properties, ensuring that to complete a transaction, a blockchain user must have access to secret information (secret key) open only to him.

As shown at step 201, a system member logs in to the system, goes to his personal account and enters the address of the external blockchain that he wants to verify into the system. Optionally, alongside with the address, one can additionally enter the name and comment to the entered address (for example, this may be required if the user has several addresses in one or several external blockchains, which he uses for various purposes). Further, as shown at step 202, the system remembers the address of the member who entered it, blocks the ability to re-add the verified address by other members, and offers the member to choose one of the possible ways to verify the entered address in one of the possible ways.

The first way is to make a transaction in an external blockchain from a verifiable address to an address belonging to the system and also located in the external blockchain. At step 205, the system tracks the transactions of the external blockchain between the verified address and the address belonging to the system. In case of detection of the desired transaction at step 206, the system proceeds to step 210 and completes the verification procedure.

The second way is to sign the message generated by the system and adding the electronic signature into the system. At step 204, the system generates a unique message (for example, a several words phrase or simply a random set of numbers, letters, and other characters) and displays it to the system member who verifies the address. Next, at step 207, the system member enters the specified message into a computer program that allows performing transactions and other operations in the external blockchain (the verified address belongs to this blockchain). The computer program signs the entered message using cryptographic algorithms, using secret information known only to the address owner (private key), and displays the result (electronic signature) to the user. The electronic signature at step 209 is entered by the member into the system, after which the system checks the signature compliance with the verified address and the previously generated message. In case the electronic signature passes the verification, the system proceeds to step 210 and completes the verification procedure.

In some cases, the user has no possibility to select the address from which the transaction will be made in the external blockchain and the secret information necessary for signing the message may not be available (for example, the external blockchain address is created by the cloud wallet or exchange where the user is registered and the transactions are performed using cloud wallets or exchanges on behalf and upon authorization of the user).

This method requires confirmation from the direct owner of the address. In these cases, to verify the address belonging to the system member, the third method of verification can be used via an automated program interface for interacting with partner computer programs. As shown at step 203, the system either requests information about the owner of the verified address from the partner computer program, or requests a list of addresses belonging to the system member based on personal data provided by the system member (such data can include the name, year of birth, ID document number, etc.). As shown at step 208, the system receives a response from the partner computer program and checks the data in the response with either the information provided by the member (in case of address request), or checks the availability of verifiable address among the addresses registered for the system member who verifies the address (in case of request by personal information about the verified address owner). In the case of detection of coincidence between the data requested and returned in response, the system proceeds to step 210 and completes the verification procedure.

At step 210, the system saves information about the successful completion of the verification procedure, after which information about the verified address and the transactions in which it participated is being constantly monitored, analyzed and used by the system modules for various needs (to calculate the level of trust in the system member, to generate and issue documents confirming ownership of funds, etc.). FIG. 2.1. illustrates an example of authentication and authorization in the system using biometric data, which can be used to gain a member access to his/her profile and/or to conduct operations and control the addresses of external blockchains belonging to him/her. At step 2101, the system prompts the user to select the object to be protected and the action with it. The protected object can be, for example, a system member profile or an address in an external blockchain. The action may be, for example, creating a new system member profile, creating a new address in an external blockchain, obtaining access to an existing system member profile, obtaining access to manage the addresses of external blockchains, performing operations with assets at these addresses, etc.

At step 2102, the system offers the user to select one or more mechanisms based on biometric characteristics (for example, voice recognition, face recognition, fingerprint recognition, iris recognition) to be used for authentication, and one or more additional mechanisms not related to biometric data (for example, one-time code for e-mail, code in USSD message, code in SMS message, code in voice message, password entry). The choice of an additional mechanism that is not related to biometric data is necessary to increase the level of security, since the devices that the user has (for example, a smartphone or a graphics tablet, which usually have, beside a microphone, a camera and/or a fingerprint scanner), may not have enough accuracy to achieve a guaranteed recognition result.

Next, at step 2103, the system requests the data required for the selected authentication mechanisms (photo or video for face recognition, voiceprint audio recording for voice recognition, fingerprint sample, etc.). After receiving all the data required for authentication, at step 2104, the system stores the received data (or parts thereof, necessary for reliable operation of the authentication algorithms) in the system storage.

Next, at step 2105, the system performs the actions selected at step 2101 with the protected objects (for example, creates a new user profile, addresses in external blockchains, transfers assets, etc.) and provides an authorized user with access to the protected objects. After completing step 2105, the user can log in to the system, having passed the authentication procedure using the selected parameters and gain access to the protected objects. For authorization in the system at step 2106, the system prompts the user to select the authentication mechanisms that were selected earlier at step 2102.

Next, at step 2107, for the selected authentication mechanisms, the system requests the input of data required for authentication (photo or video for face recognition, voiceprint audio recording for voice recognition, etc.) and, if necessary, sends to the user and waits for the user to enter the one-time sent code and/or password. After receiving all the necessary data, at step 2108, the system searches for the matches of the entered data with the samples in the system storage. If successful matches are found for all the entered authentication data, then at step 2109 the user is successfully authorized in the system and is granted access to protected objects.

Figure 3:
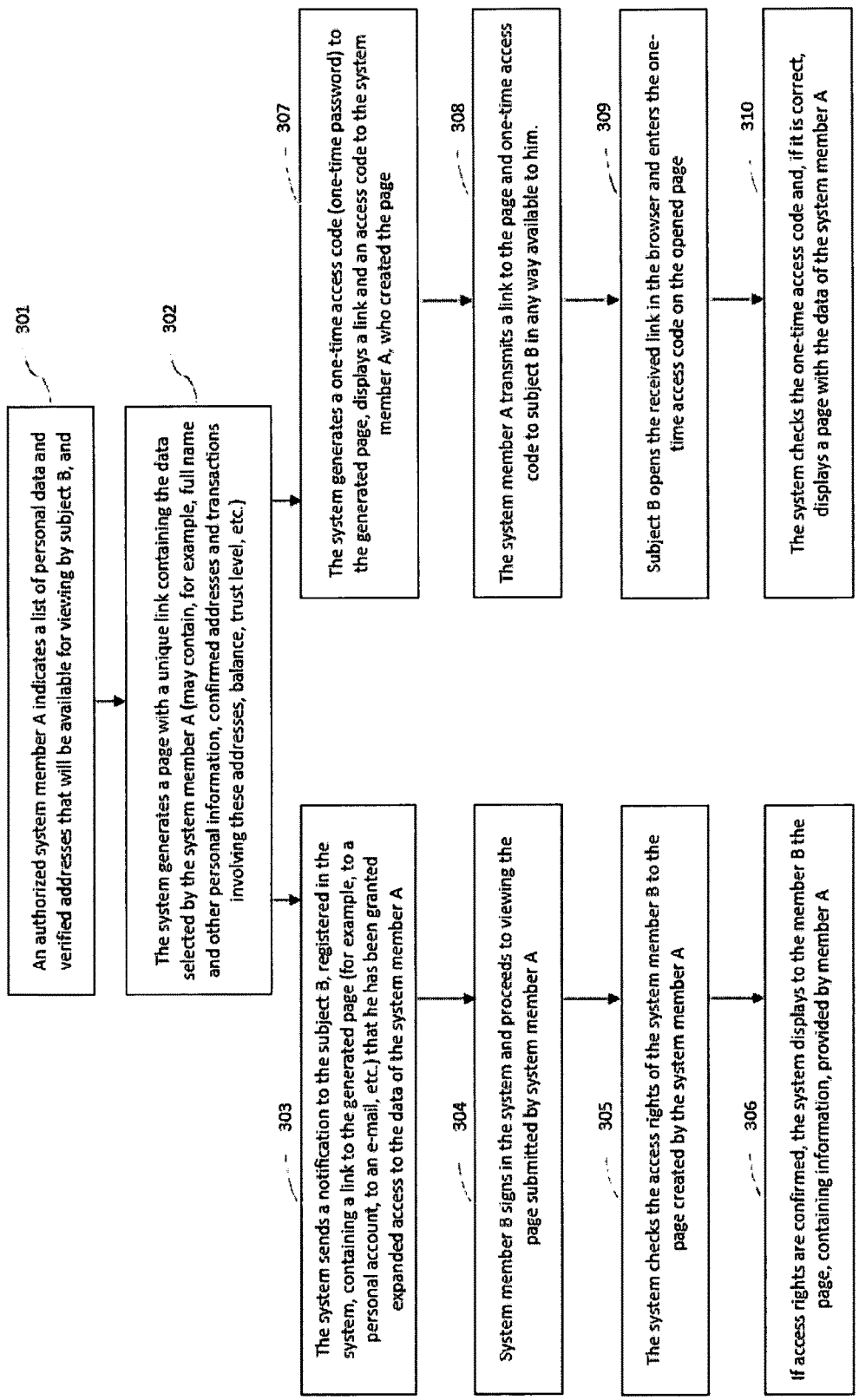
FIG. 3 illustrates a method for verifying the identity and addresses of a system member to third parties.

FIG. 3 illustrates a method for verifying the identity and addresses of a system member for third parties, in the system shown in FIG. 1. The possibility of confirming the identity and existing assets to third parties follows from the fact that the system can unambiguously determine the external blockchain address belonging to the system member based on the available data. At step 301, member of the system A is authorized in the system, enters his personal account, selects personal data and verified addresses that will be temporarily available for viewing by a third party (subject B), and also indicates whether B is a member of the system or not.

At step 302, the system generates a page with a unique link containing the data selected by the system A member (for example, surname, name, ID documents and other personal information, addresses confirmed by the member, and transactions involving these addresses, balance, level of trust, etc.) intended to be viewed by subject B. If subject B is the system member, the system proceeds to step 303 and via the alert and notification module 12 sends him a notification containing a link to the generated page saying that he has been granted expanded access to the data of the system A member.

At step 304, the system member B needs to log in to the system and go on to view the personal page created for him with the data of the system A member. Before displaying the page, the system performs step 305 and checks the rights of the system B member to access the system A member data displayed on the page. If the check is successful, the system proceeds to step 306 and displays a page containing all the data allowed for viewing. Otherwise, the page is not displayed.

If subject B is not the system member, the system proceeds to step 307, in which it generates a one-time access code (password) to view the page created at step 302, and displays a link to the page and a one-time access code to system A member who is creating the page. The system A member at step 308 sends the link to the page received from the system and the one-time access code to subject B in any way available to him via external communication channels (for example, sends via messenger, by e-mail, SMS or informs by phone).

At step 309, subject B, in order to view the page, opens a one-time link in any available computer program for viewing webpages on any device or computer system with Internet access. On the page that opens, subject B enters a one-time access code to the page created at step 302. After the code has been entered, the system proceeds to step 310 and checks whether the entered code matches the one-time access code to the page generated at step 307 and, in case of coincidence, displays the page containing all the authorized data to the subject B. Otherwise, the page is not displayed.

Additionally, the system member who creates the page has an option at any time to set the time during which the page will be available for viewing, to prohibit its viewing by third parties, or completely remove it.

Figure 4:
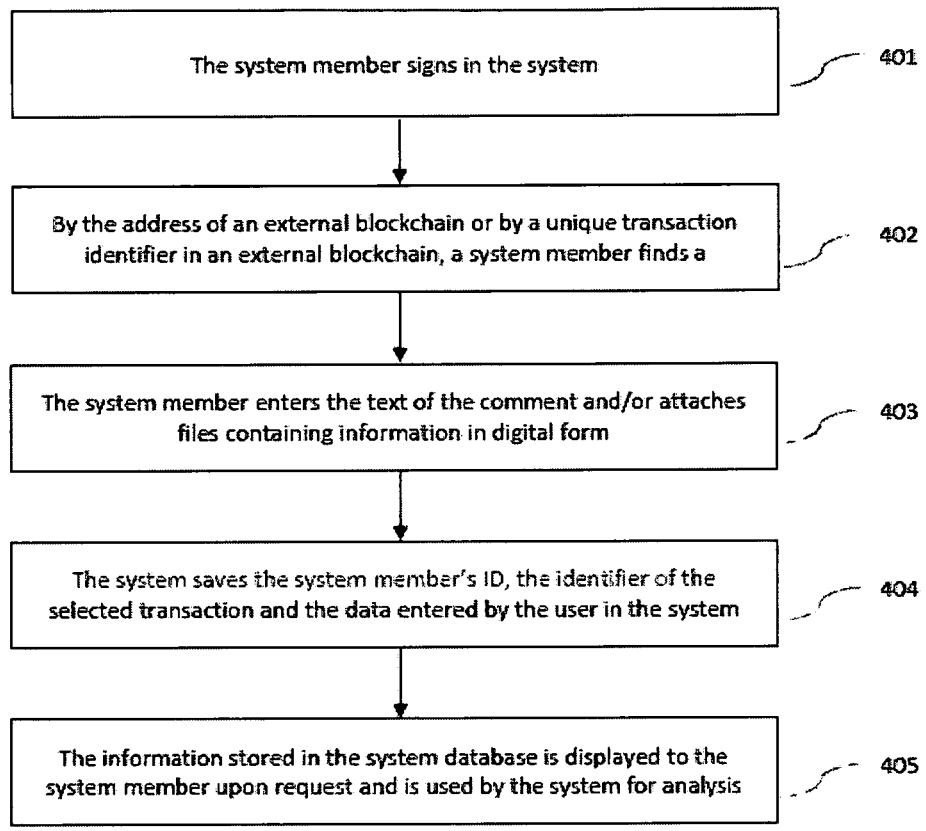
FIG. 4 illustrates the assignment of comments to external blockchain transactions.

FIG. 4 illustrates the assignment of comments to external blockchain transactions. Most of the existing electronic currencies and electronic contracts do not allow adding and storing additional information about transactions. However, this functional often (for example, for remembering the payment purpose, keeping records of expenditures and revenues) shown in FIG. 1 allows to circumvent this restriction and make the use of electronic currencies more convenient.

To assign a comment at step 401, the system member is logged in to the system. Further, at step 402, according to the information available to the member, a search of the desired external blockchain transaction is performed. The transaction can be, for example, selected from the list of all the transactions in which the address participated, or found directly by the known external blockchain transaction number, depending on the transaction information available to the user.

At step 403, the system offers the member to enter a comment line and upload files containing information in digital form. The user enters a comment line and optionally uploads files containing arbitrary information in digital form (for example, photos of goods, contracts under which goods were paid for or assets were transferred in this transaction), whereupon at the next step 404 the system saves in the internal database a record containing a unique user ID in the system, an external blockchain transaction ID, as well as a comment line entered by the user and the uploaded files. At step 405, the user can log in to the system at any time and view a list of his previously saved comments and download the uploaded files.

Figure 5:
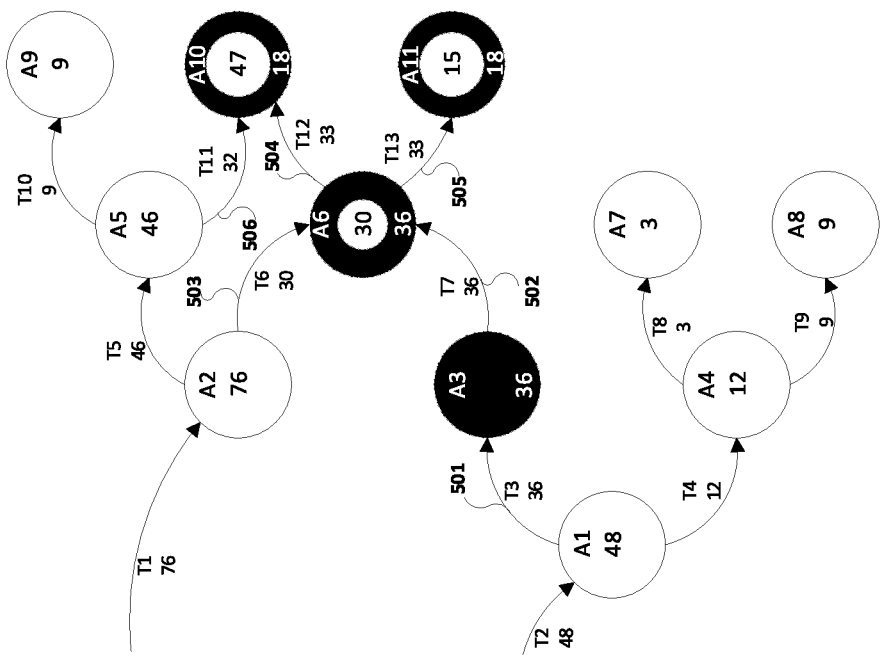
FIG. 5 illustrates the tracking and marking of stolen funds and funds involved in illegal operations.

FIG. 5 illustrates an example of tracking and marking stolen funds and funds involved in illegal operations. To start tracking and marking stolen assets or funds involved in illegal operations, the system receives data on transaction identifiers of external blockchains in which illegal transfer of funds took place. Transaction data can, for example, be entered by operators through the back-office graphical user interface or from external partners via automated software interfaces. Let us suppose one wants to track further movement of assets, starting from transaction T3 (for example, assets were stolen from address A1). The tracking and marking algorithm calculates the volume of transaction assets intended for marking using the following formula:

$$V\_m1 = V\_T \times V\_m / V$$

where:

V_m1—volume of marked assets sent to the recipient

V_T—total volume of assets sent to the recipient in the transaction

V_m—volume of marked funds at the sender's address before the transaction

V—balance at the sender's address before the transaction

At step 501, the system finds transaction T3 in the external blockchain, starting with which it is necessary to track 36 units of assets in all subsequent transactions and mark them at address A3. Then the system continues to analyze transactions at address A3. The balance at address A3 becomes equal to 36 units.

At step 502, the system analyzes the transaction T7, in which the assets are transferred from address A3 to address A6; as a result, the balance of address A6 becomes equal to 36 units. The system marks 36 units of assets at address A6 and continues the further analysis of incoming transactions at address A6. At step 503, the system analyzes the transaction T6 in which 30 units of assets are transferred from address A2 to address A6. As a result of the transaction, the balance of the address A6 becomes equal to 66 units. Marking is not performed, as the funds received from address A2 do not contain funds that need monitoring. Then the outgoing transactions from the address A6 are analyzed.

At step 504, the transaction T12 is analyzed, in which 33 units of funds are transferred to address A10. The balance of the address A6 is 66 units, with 30 of the 66 funds available on the balance not marked and 36 of the 66 units of funds marked. Accordingly, the number of funds not subject to marking at address A10 can be calculated from the ratio 33*30/66=15 units, and the number of funds subject to marking −33*36/66=18 units. As a result, the system marks only 18 units out of 33 transferred in the transaction at address A10. The balance on the A6 after completing the transaction T12 is 66−33=33 units, and out of the 36 units marked earlier 18 are transferred to address A10, respectively, 36−18=18 units are marked, and 33−18=15 units are not marked. The balance of address A10 after the completion of the transaction T12 becomes equal to 66−33=33 units.

At step 505, the system continues the analysis of outgoing transactions of address A6 and analyzes transaction T13, in which 33 units of assets are transferred to address A11. As a result of the transaction, the balance of address A10 becomes equal to 0, at address A11—33 units, thereof 18 units of assets are marked, and the remaining 33−18=15 units are not marked.

Next, the system proceeds to the analysis of the address A10 transaction. At step 506, the incoming transaction T11 of address A10 from address A5 is analyzed, as a result of which 32 units are credited to address A10 and the resulting balance becomes 47 units. Marking is not performed, as the assets received from address A2 do not contain funds that need monitoring. 18 units remain marked from step 504.

The above algorithm can be applied not only for tracking and marking the outgoing transactions, but also for tracking and marking the incoming ones. The tracking and marking functional can be used not only to track illegal transactions, but also, for example, to provide users with the ability to view from whom the funds were transferred to them or to whom the funds were then transferred from the addresses of direct counterparties.

Figure 6:
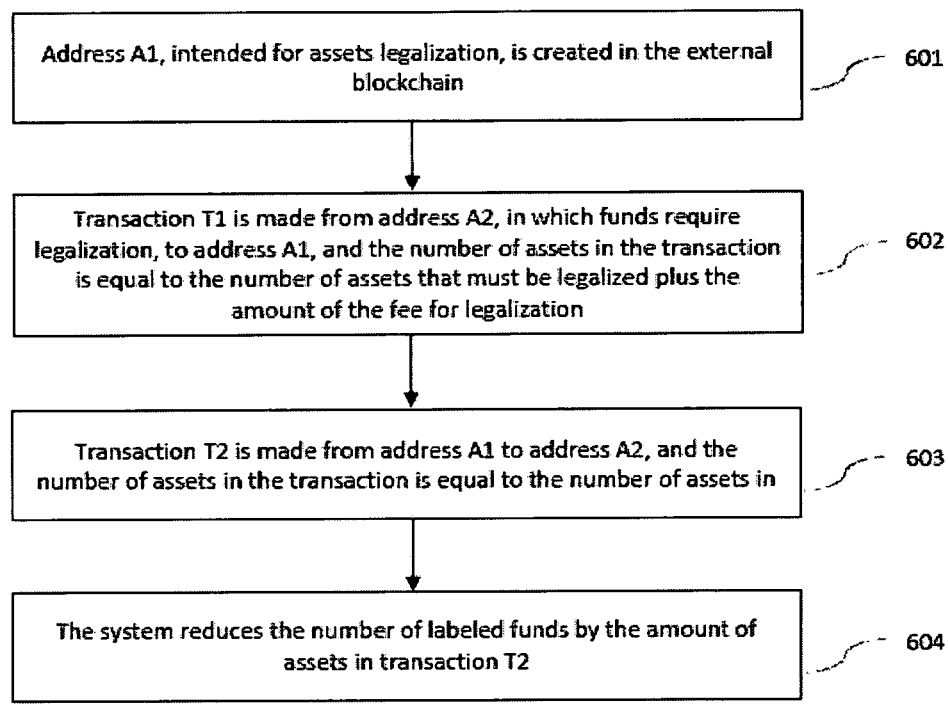
FIG. 6 illustrates the method of legalizing stolen assets and assets involved in illegal turnover.

FIG. 6 illustrates the method of legalizing stolen assets and assets involved in illegal turnover. The presence of a mechanism for tracking and marking assets allows the legalization of stolen funds and funds involved in illegal operations. One of the ways is to transfer or enter into the system the incoming transaction identifiers to the addresses of external blockchains, where the users need to perform legalization, and the amount of the fee. After receiving the data, the system reduces the amount of marked assets at the address at which the transaction was made by the amount of the specified transaction. The method is inconvenient because, firstly, the system will have to storage and process each legalization transaction and the fee separately, and secondly, when data is lost, legalization data recovery can be difficult or impossible.

Another method is given below and allows organizing legalization fully automatically by creating special addresses in external blockchains intended for legalizing the assets. At step 601, a new address A1 intended for legalization is created in the external blockchain, in which it is necessary to perform legalization, and it is transmitted to the system. At step 602, a subject who wants to legalize his stolen assets and assets involved in illegal turnover creates a transaction in the external blockchain from address A2, which contains legalized assets, to address A1 for a volume equal to the amount of funds that need to be legalized plus the amount of the legalization fee. At step 603, when an incoming transaction is received at address A1, the automated system deducts the legalization fee from the amount of the transaction and transfers the remaining balance back to address A2 from which the transaction was made. At step 604, the automated assets tracking and marking system detects a transaction from address A1 intended for legalization to address A2 and reduces the amount of stolen assets and assets involved in the illegal turnover at address A2 by the amount of the transaction.

FIG. 6.1. illustrates the method of separating stolen or illicit assets from other assets. This method allows dividing assets, and thus blocking the funds involved in the illicit traffic at individual addresses of the external blockchain. At step 6101, the system member enters the external blockchain address A1, to which the marked funds are to be transferred (alternatively, the system as directed by the member creates for him the address A1 in the external blockchain). The system marks the address A1 as the address intended for the storage of stolen assets and assets involved in illegal turnover.

At step 6102, the system member to whom the A2 address belongs commits from it a T1 transaction containing the amount of marked funds to be separated from the A2 address to the A1 address belonging to one external blockchain. Next, at step 6103, the system reduces, at address A2, the amount of marked funds by the amount of assets in transaction T1, and at address A1 it marks all the assets received in transaction T2 as the funds involved in illegal turnover. If necessary, steps 6102 and 6103 are repeated by the member for all the addresses where there are marked funds.

After transferring the marked funds to individual addresses, the original addresses from which the funds were transferred will contain only the funds that were not involved in the illegal turnover (there will be no marked assets), which will, firstly, increase the assessment of the level of trust in the member's addresses, and secondly, the total member trust level will increase (after confirming the record of the funds separation transaction into the external blockchain and system processing of this transaction). At the same time, historical data on the availability of marked funds remain saved both in the system and in the external blockchain.

Figure 7:
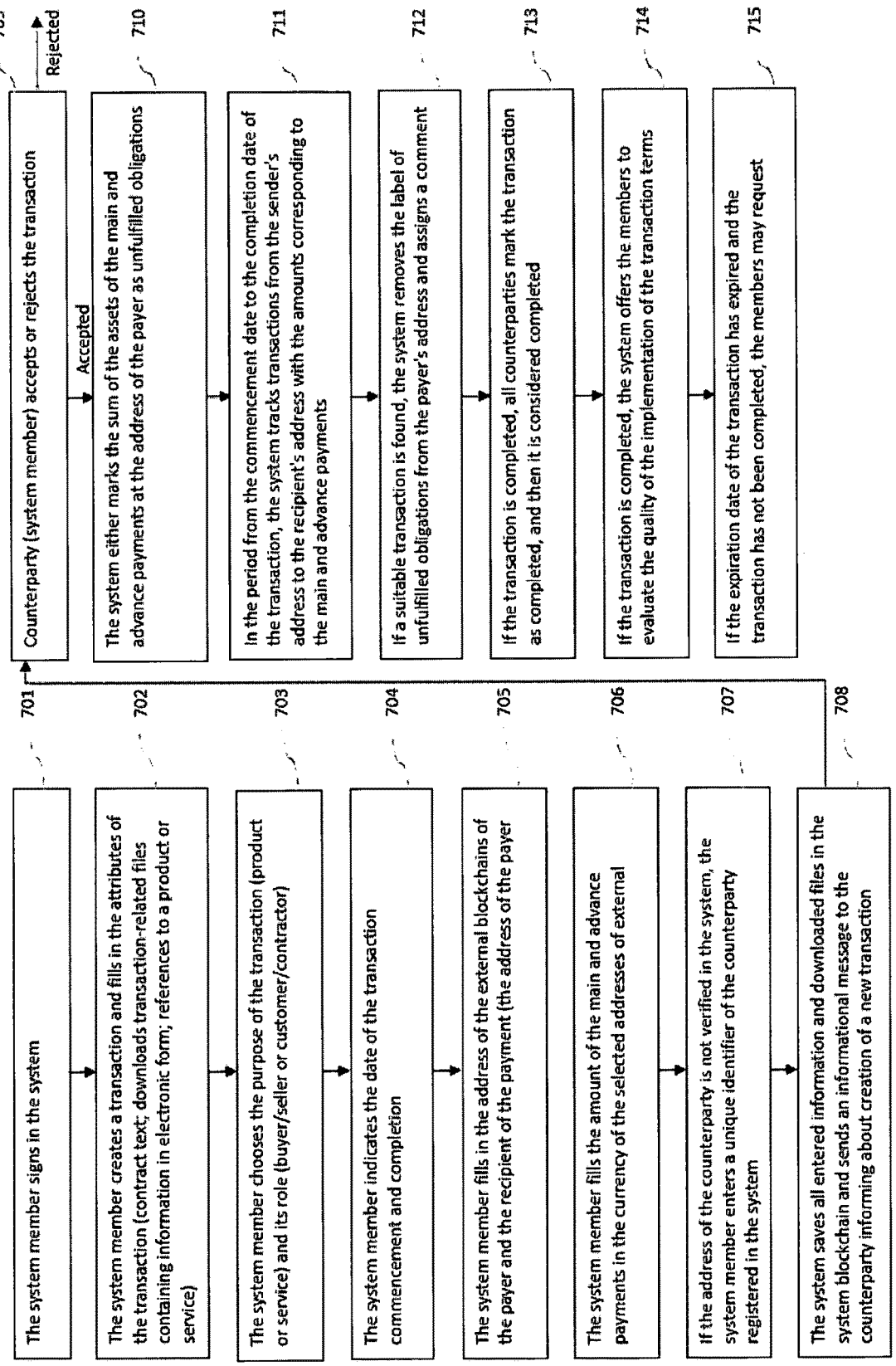
FIG. 7 illustrates a method for creating and conducting a transaction between system members.

FIG. 7 illustrates a method for creating and conducting a transaction. The system allows members to create and conduct transactions with each other, as well as assess the quality of service. All information on the transaction is stored in the system blockchain, which guarantees the impossibility of modifying data after saving. At step 701, the system member is authorized in the system, and then at step 702 creates a new transaction and fills in the transaction attributes, which include the contract text, the upload of transaction-related files containing electronic information and the addition of links to a product or service.

Next, at step 703, the system member chooses the purpose of the transaction (purchase of goods or provision of services) and indicates his role in the transaction (buyer or seller in the case of purchasing the goods; customer or contractor in the case of rendering services); at step 704 the system member chooses the transaction commencement and completion dates, after which at step 705 he fills in the addresses of the external blockchain of the payer and the recipient (all addresses must be in the same external blockchain). Next, at step 706, the amounts of the main and optionally advance payments are filled in. If there is not enough funds on the payer's address to pay for the contract (including those temporarily blocked by other transactions), the system shows a warning message to the member.

Next, at step 707, the system checks whether the counterparty address is verified by one of the system members. If the address is verified, the system automatically submits the counterparty's system unique identifier into the transaction. Otherwise, the member must enter the counterparty ID manually. Then at step 708, the system saves all entered information and uploaded files in the system blockchain, after which it sends an information message to the counterparty informing him about the creation of a new transaction, places the transaction in the members' personal accounts and waits for confirmation or rejection by the counterparty.

At step 709, the counterparty logs into the system, enters a personal account, examines the terms of the transaction, and either rejects the transaction (status "rejected" is assigned to the transaction) or accepts its terms. If the counterparty accepts the transaction terms, at step 710 the system marks the sum of the assets of the main and advance payments at the payer's address as outstanding obligations (to allow other members in the system to assess the counterparty's solvency). Next, the system waits for the transaction commencement date.

After the transaction commencement date at step 711, in the period from the transaction commencement date to completion date, the system tracks transactions from the sender's address to the recipient's address with amounts corresponding to the main and advance payments. If a matching transaction is found, the system removes the outstanding obligations marking from the payer's address at step 712 and assigns a comment to the transaction with the contract number, storing it in the system storage. After that, it waits for counterparty actions to close the transaction.

After all the transaction terms have been fulfilled, at step 713, the counterparties confirm the completion of the transaction (transaction is considered completed only if all counterparties have confirmed that the transaction is completed). If the transaction is completed, then at step 714 each system member who participated in the transaction must assess the quality of the fulfillment of the contract terms by the counterparty. This information will be used in assessing the level of trust in the system members. In the event that a transaction is not completed by one or more counterparties and the transaction period expires, the members can either cancel the transaction or use the arbitration service to clarify disputes.

FIG. 7.1. illustrates the method of using escrow addresses when conducting transactions. When conducting transactions, the system allows the use of escrow addresses to guarantee the fulfillment of contract terms. At step 7101, the system member is authorized in the system and in his personal account he creates an escrow address in one of the external blockchains, then at step 7102 the system, via automated partner software interfaces, creates the escrow address A1 in the external blockchain specified by the member and saves the information of the address and the person who created it in the internal data storage.

At step 7103, before creating a transaction involving the escrow address as the payer's address, the system member needs to replenish the escrow address at least with the amount which is needed for the transaction. To do this, the system member, in the external blockchain, commits transaction T1 to the escrow address A1, containing the amount of assets S1 sufficient to secure the payer obligations under the transaction. Further, when creating a transaction at step 7104, the escrow address A1 is specified as the address of the payer, after which at step 7105 the system waits for all parties to accept the terms of the transaction.

After the terms of the transaction are accepted by all parties, at step 7106, the system checks the adequacy of the unblocked funds, blocks the amount of the advance and principal payments for the transaction at escrow address A1 and waits for the transaction commencement date (if there are not enough funds, the system notifies all counterparties and the transaction is considered invalid until the receipt of the required number of assets to ensure the conditions for the fulfillment of obligations under the transaction).

On the transaction commencement date, at step 7107, the system makes an advance payment transaction T2 from the blocked funds from escrow account A1 through the partners and assigns a comment with the number of the contract under which the advance payment is made to transaction T2.

After making the advance payment, at step 7108, the system waits until the payer marks the transaction as completed. If the payer marked the transaction as completed, the system at step 7109 performs the main payment transaction T3 from the escrow account A1 from the previously blocked funds through the partners and assigns the comment to the transaction T3 with the number of the contract under which the payment was made. Further, at step 7110, the system waits for all counterparties to mark the transaction as completed, after which the transaction is considered completed.

FIG. 7.2. illustrates the method of resolving disputes between the parties with possible involvement of mediators. The system provides members with the opportunity to receive assistance in case of disputes. Disputes may arise for various reasons, for example (but not only), in case of unfair performance of obligations of concluded deals. If necessary, the disputing parties may involve third parties (experts) who may act as arbitrators (mediators). All information entering the system is stored in the system blockchain, which makes it possible to re-examine it at any time, as well as at the request of the members to provide it to third parties (for example, to the court if the parties fail to agree or disagree with the mediators' decision). Besides the fact that the system itself is an independent third party, the information in the system blockchain cannot be changed or deleted after recording, therefore it can be convincing evidence in court.

At step 7201, the member is authorized in the system, after which at the next step 7202 he/she opens a dispute (for example, a claim), chooses a method of resolving the dispute (for example, with or without the involvement of mediators), presents the arguments (claims to opposite parties), chooses the parties to the dispute (the parties) and indicates their role in the dispute (for example, the claimant or the defendant).

At step 7203, the system saves all entered information in the system blockchain, sends all the members a notification about the dispute opening, and then waits for confirmation of the dispute opening from all the members. At step 7204, all the parties confirm the dispute opening and, if necessary, select one or more mediators (experts, arbitrators) from the list proposed by the system. Mediators are persons (experts) who have the necessary knowledge to consider the subject of the dispute.

Next, at step 7205, all the parties set forth their arguments (in text form, through voice or video chat, in which sound and video are recorded, by loading the documents and other data in digital form relevant to the issue). At step 7206, the system stores all the information received from the members (entered text, audio and video records of conversations, downloaded files) in the system blockchain and waits for the rendering the dispute decision.

At step 7207, the parties and/or mediators study all the available materials obtained at step 7205, and agree on a way to resolve the dispute (if mediators are involved, they render decision independently). At step 7208, the system stores all the data about the dispute decision rendered in the system blockchain and waits for confirmation of the decision execution by the parties to the dispute, after which the dispute is considered closed.

Figure 8:
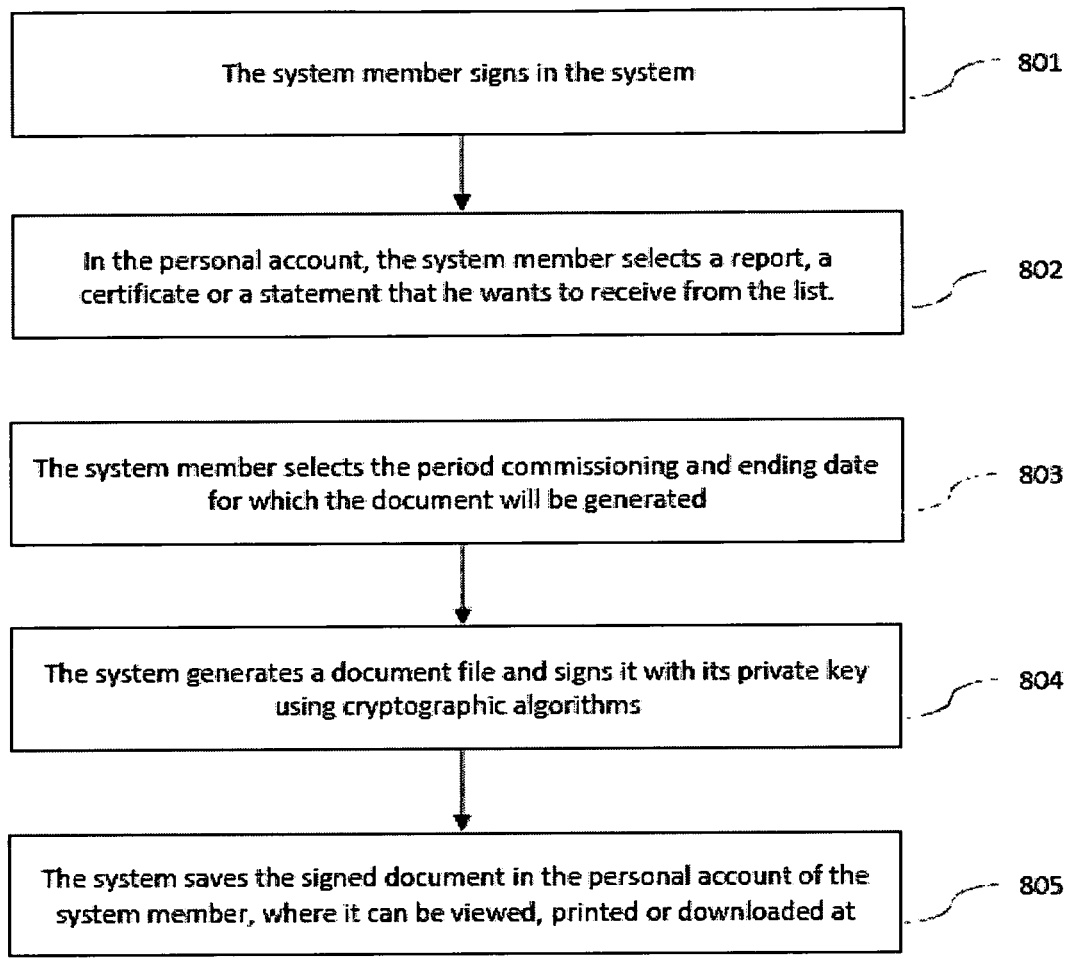
FIG. 8 illustrates a method for generating and issuing reports and statements to the system members.

FIG. 8 illustrates a method for generating and issuing references and statements to the system members. The blockchain technology ensures that data cannot be changed after they are saved. The system methods for verifying the system member addresses and identity confirmation enables the system to generate document files (reports and statements) signed using cryptographic algorithms that can be used for evidence in case of disputes between two subjects.

At step 801, the system members is authorized in the system, and then at step 802 in his personal account selects one of the available reports (note that the above list is not complete): net assets statement; extract containing wallet information (rating, balance) for a specified date; system member account balance statement; income or assets statement; statement for the required date on the availability of marked funds in the history of wallet transactions; confirmed official income statement; investment or credit history statement; statement of historical data of the system members rating.

Next, at step 803, the system member selects the start and end date of the period for which the document must be generated, then at step 804 the system generates the document file and signs it with its private key using cryptographic algorithms, and then at step 805 the system saves the signed document in the personal account of the system member, where it can be viewed, printed or downloaded to the user's device at any time.

Figure 9:
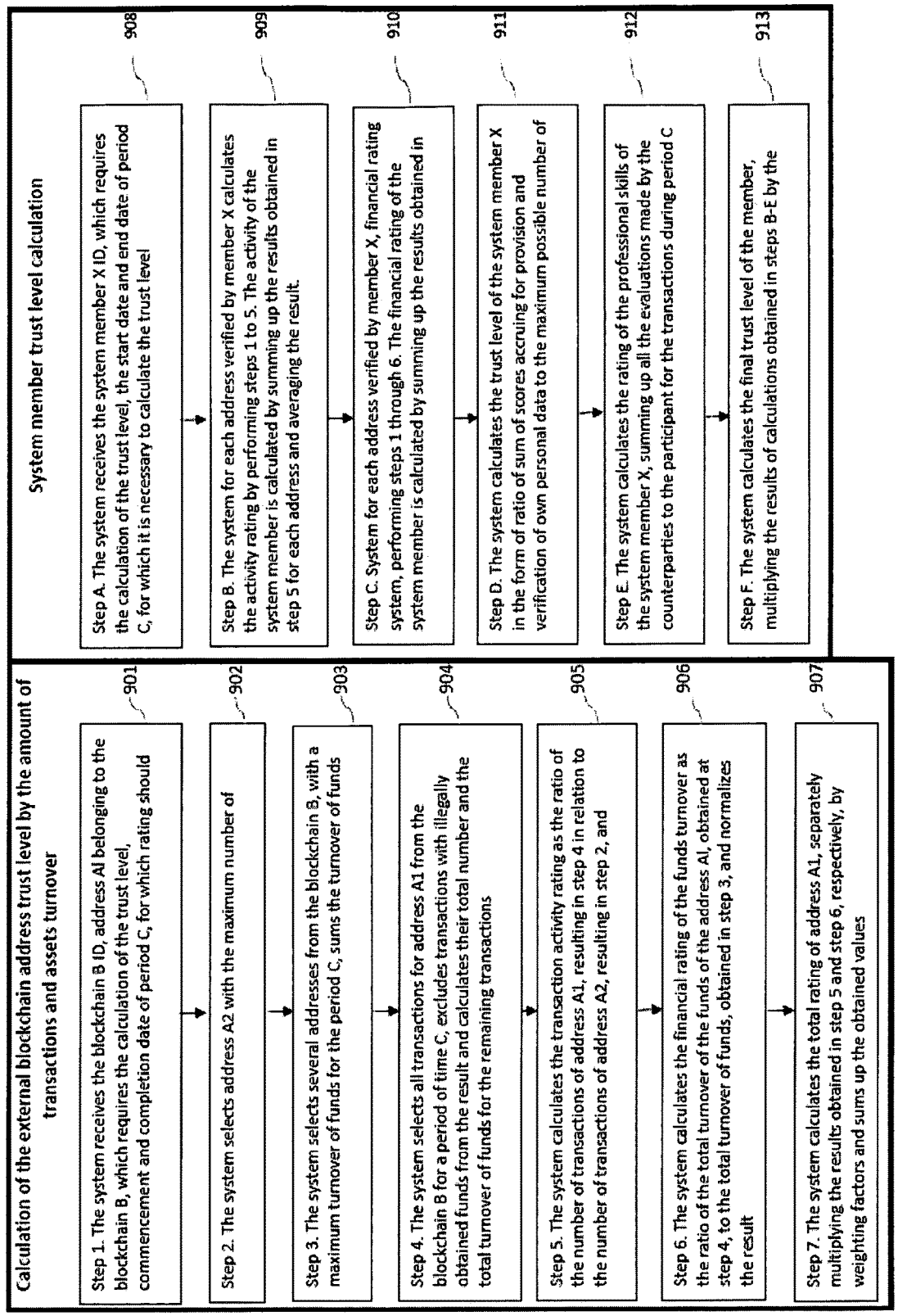
FIG. 9 illustrates an example of calculating the level of trust in a system member.

FIG. 9 illustrates an example of calculating the level of trust in a system member. This example is provided solely to clarify the principle on which the calculation of trust levels is based and does not limit its implementation. The final level of trust in the system member includes the level of trust in all addresses verified by the member. At this stage, information about the owner of the address is not required, so the level of trust in the address can be calculated for any address of the external blockchain, regardless of whether the address is verified in the system by one of the members or not.

At steps 1-7, an example of calculating an address rating is given. At steps A-F an example of calculating the final level of trust in a system member is given. At step 1, the input parameters are transferred to the system—blockchain B identifier, address A1 belonging to blockchain B, for which it is needed to calculate the trust level, the start and end dates of period C, for which the rating must be calculated. At step 2, the system analyzes all transactions of the blockchain B and selects the address A2, which participated in the maximum number of transactions for the period C. At step 3, the system analyzes all transactions of the blockchain B and selects several addresses, with a maximum turnover of funds for the period C. For the selected addresses, the turnover of funds is summed and the result is divided by the number of addresses. Such an operation is necessary to rule out a situation in which a single address in the blockchain has a significantly larger turnover than all the others.

At step 4, the system selects from blockchain B all the transactions of address A1, for which the rating is calculated, for the time period C. Then, transactions that contain stolen funds or funds involved in the illegal turnover are excluded from the found transactions (thus it is possible to exclude illegal funds from the rating). For the remaining transactions, the system calculates their total amount and the total turnover of funds.

At step 5, the system calculates the transaction activity rating as the ratio of the number of address A1 transactions, resulting at step 4, to the number of address A2 transactions, resulting at step 2. The result obtained is normalized. At step 6, the system calculates the financial rating of the funds turnover as the ratio of the total funds turnover of address A1, resulting at step 4 to the total funds turnover obtained at step 3, and normalizes the result (for a more convenient presentation).

At step 7, the system calculates the total rating of address A1, separately multiplying the results obtained at step 5 and step 6, respectively, by weighing coefficients, and sums the values obtained. The weighing coefficients are necessary to obtain a representation in a human perceivable form.

As a result of the calculations, there are three basic values characterizing the activity, financial condition and their combination. These values can be calculated for any address in any external blockchain.

In addition, the financial integrity of the address can be calculated, for example, as the ratio of the volume of assets involved in the illegal turnover on the analyzed address for the period examined to the assets involved in the illegal circulation of all addresses for the same period.

To calculate the member trust rating, at step A, the system obtains the member ID of system X, for whom it is necessary to calculate the level of trust, as well as the start and end dates of period C, for which the level of trust must be calculated. At step B, the system calculates the activity rating for each address verified by member X, following steps 1-5. The activity of the system member is calculated by summing up the results obtained at step 5 at each address and averaging of the result.

At step C, the system calculates the financial rating for each address verified by member X, following steps 1-6. The financial rating of the system member is calculated by summing up the results obtained at step 6 for each address and averaging of the result. At step D, the system calculates the trust rating for the member in the X system as the ratio of scores accrued for providing and confirming their personal data (email address, phone number, name, identity documents, etc.) to the maximum possible number of scores that may be awarded to the member for the provision of verified personal information.

At step E, the system calculates the professional skills rating of the system X member, summing up all the scores from the counterparties to the member for conducting transactions over the time period C and averaging of the result by dividing it by the maximum amount that the member gets for this operation. At step F, the system calculates the final level of trust in the member, multiplying the results of the calculations obtained at steps B-E by the normalizing coefficients and summing up the results. The coefficients allow, firstly, to change the weight of individual parameters in the final result, and secondly, to present the result in a human perceivable form.

Figure 10:
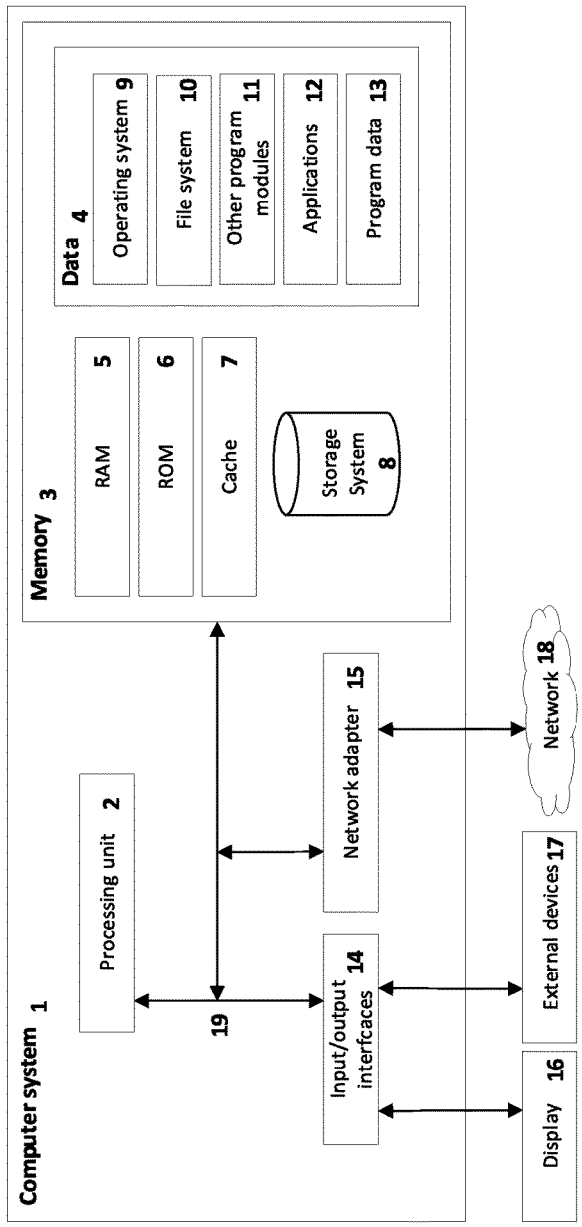
FIG. 10 illustrates an example of a computer system on which the system implementing the patented method can operate.

FIG. 10 illustrates an example of a computer system on which a system that implements the patented method can function. The system can work on one or several computer systems (computers or servers). Computer system 1 includes one or more processors and/or processor modules 2, memory 3 and system bus 19, which connects all components of the system, in particular system memory 3 to processor 2.

The system bus 19 is one or several buses of different types, including a memory bus or memory controller, a peripheral bus, a processor bus, a local bus, a graphics adapter bus, based on a set of bus architectures. A brief example is a peripheral component interconnect (PCI) bus, a peripheral component interconnect express (PCI-E) bus, a universal serial bus (USB), a video electronics standards association (VESA) bus, etc.

Computer system 1 may include readable media. For example, read-only memory 6 (ROM), random access memory 5 (RAM), cache memory 7. In addition, the computer system includes other removable or non-removable, durable or non-durable media. As an example, system storage 8 can read and record information from/to removable or non-removable hard disk drives (HDD), flash drives, magnetic disks, optical disks (CD-ROM, DVD-ROM, etc.). All devices are connected to the bus 19 through various data transfer interfaces.

In addition to the implementation of the patented system, the memory 3 contains operating system 9, file system 10, application modules 12, data and program files 13, other program modules 11, and any combinations thereof.

The computer system may interact with one or more external devices 17, such as a keyboard, pointing device, external data storage device (e.g., flash disk), monitor 16, one or more devices allowing the user to interact with computer system 1, and/or devices (for example, a network card, modem) that allow computer system 1 to interact with other computing devices. This interaction takes place through I/O interfaces 14. Besides, computer system 1 can interact with one or more computer networks 18, such as a local area network (LAN), a wireless network (WAN), a public network (for example, the Internet) through network adapters 15. Network adapters 15 are connected and interact with other components of computer system 1 via bus 19. It should be noted that other equipment and/or software components can be used together with the computer system 1. For example, microcode, device drivers, external disk arrays and data storages, backup computing devices, RAID arrays, archiving subsystems, etc.

It should be also borne in mind that computer system 1 is the basic component for building cloud computing networks and data storages, which are a set of computer systems 1 connected through a network and controlled by special software that allows all the servers to interact as a whole.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for providing secure transactions via blockchain technology, the method comprising the steps of:
    linking an external blockchain address to a registered user by a verification of the external blockchain address of the user;
    in response to said verification, saving the verified address and monitoring the address and one or more blockchain transactions in which the address participated;
    creating or conducting the one or more blockchain transactions between the user and one or more other users;
    tracking and marking one or more stolen assets or assets involved in illegal transactions;
    analyzing the one or more blockchain transactions to estimate a level of trust for the user; and
    wherein said verification comprises logging-in by the user; entering by the user the external blockchain address; blocking the address such that the address is not entered by another user;
    prompting the user to verify the address by making a transaction in blockchain from the address being verified to another address located in an external blockchain; tracking the transaction; and in response to a detection of a completed transaction, verifying the external blockchain address of the user.

2. The method of claim 1, wherein said verification comprises:
    receiving by the user a message,
    signing the message by an electronic signature, wherein the electronic signature is a cryptographic key known only to the user;
    transmitting the signed message for verification of the electronic signature; and
    verifying the electronic signature and the external blockchain address of the user.

3. The method of claim 1, further comprising:
    verifying an identity and the external blockchain address of the user for a third party, wherein said verifying comprises:
    selecting by the user information to be temporarily shared with a third-party user, wherein the information is personal data and a verified blockchain address;
    generating a page with a unique link containing the information and transmitting the link to the third-party user; and
    granting an access to the third-party user to view the information based on a status of the third-party user, wherein the status is defined as one of: a registered user or an unregistered user.

4. The method of claim 1, further comprising:
    locating the one or more blockchain transactions by the external blockchain address or a unique transaction identifier;

assigning a comment to the one or more blockchain transactions; and storing the comment in a database for displaying the comment, upon request, to the user.

5. The method of claim 1, further comprising:

legalizing the one or more stolen assets or assets involved in illegal transactions; or separating the one or more stolen assets or assets involved in illegal transactions from other assets, wherein said separating comprises blocking one or more funds involved in an illicit traffic at a particular external blockchain address.

6. The method of claim 1, wherein said conducting the one or more blockchain transactions comprises facilitating use of an escrow address to guarantee fulfillment of terms of a contract.

7. The method of claim 6, wherein said conducting the one or more blockchain transactions further comprises resolving a dispute between the user and one or more other users.

8. The method of claim 1, further comprising generating and displaying a reference, a statement, or a report to the user.

9. The method of claim 1, wherein the level of trust for the user is calculated for each external blockchain address of the user, wherein the level of trust is calculated in terms of a rating, and wherein the level of trust is calculated based on the one or more blockchain transactions of the user.

\* \* \* \* \*